United States Patent
Yang et al.

(10) Patent No.: US 9,049,675 B2
(45) Date of Patent: Jun. 2, 2015

(54) METHOD AND DEVICE FOR POWER CONTROL OF HIGH SPEED DEDICATED PHYSICAL CONTROL CHANNEL

(71) Applicant: Huawei Technologies Co., Ltd., Shenzhen (CN)

(72) Inventors: Yi Yang, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 14/057,879

(22) Filed: Oct. 18, 2013

(65) Prior Publication Data

US 2014/0169331 A1   Jun. 19, 2014

(30) Foreign Application Priority Data

Dec. 18, 2012 (CN) .......................... 2012 1 0551938

(51) Int. Cl.
*H04W 4/00* (2009.01)
*H04B 7/00* (2006.01)
*H04W 52/40* (2009.01)
*H04W 52/24* (2009.01)

(52) U.S. Cl.
CPC ............ *H04W 52/40* (2013.01); *H04W 52/242* (2013.01)

(58) Field of Classification Search
CPC ..... H04W 52/00; H04W 52/08; H04W 52/04; H04W 52/10; H04W 52/40; H04W 52/50; H04W 52/143; H04W 52/146; H04W 52/228; H04W 52/241; H04W 52/242; H04W 52/247; H04W 52/248; H04W 52/286; H04W 52/346; H04W 52/367; H04W 72/0473; H04W 72/1278; H04W 72/1284
USPC .......... 370/310–350; 455/13.4, 431–444, 522
See application file for complete search history.

(56) References Cited

U.S. PATENT DOCUMENTS

| | | | |
|---|---|---|---|
| 2012/0157152 A1* | 6/2012 | Blomgren et al. ............ | 455/522 |
| 2012/0213092 A1* | 8/2012 | Sun et al. ...................... | 370/248 |
| 2012/0322494 A1* | 12/2012 | Zhou et al. .................... | 455/522 |
| 2013/0136042 A1* | 5/2013 | Chan ............................. | 370/310 |
| 2013/0260814 A1* | 10/2013 | Bergman et al. ............. | 455/522 |
| 2014/0064248 A1* | 3/2014 | Hultell et al. ................. | 370/331 |
| 2014/0126534 A1* | 5/2014 | Larsson et al. ............... | 370/331 |

OTHER PUBLICATIONS

Qualcomm Europe, "On the power control for R6," 3GPP TSG-RAN WG1 #44, R1-060446, Denver, CO, Feb. 13-17, 2005, 6 pages.

* cited by examiner

*Primary Examiner* — Tri H Phan
(74) *Attorney, Agent, or Firm* — Slater & Matsil, L.L.P.

(57) ABSTRACT

The present invention provides a method and a device for power control of a High Speed Dedicated Physical Control Channel (HS-DPCCH). If a User Equipment (UE) is in a soft handover state and configured to a multi-flow transmission mode, the UE obtains a first HS-DPCCH power offset and an HS-DPCCH adjustment step size that are corresponding to each cell group in all cell groups of the UE. The UE determines a second HS-DPCCH power offset of the cell group according to the HS-DPCCH adjustment step size and the first HS-DPCCH power offset. The UE adjusts current transmit power of the HS-DPCCH according to the second HS-DPCCH power offset of the cell group.

20 Claims, 14 Drawing Sheets

---

If a UE is in a soft handover state and configured to a multi-flow transmission mode, the UE obtains a first HS-DPCCH power offset and an HS-DPCCH adjustment step size that are corresponding to each cell group in all cell groups of the UE in the multi-flow transmission mode — 301

If the UE meets a first preset condition, the UE determines a second HS-DPCCH power offset of the cell group in all cell groups of the UE according to the HS-DPCCH adjustment step size and the first HS-DPCCH power offset — 302

The UE adjusts the current transmit power of the HS-DPCCH according to the second HS-DPCCH power offset of the cell group — 303

```
┌─────────────────────────────────────────────────────────────────────────┐
│ If the UE is in a soft handover state and configured to a multi-flow    │  511
│ transmission mode, the UE obtains a maximum HS-DPCCH power offset, a    │
│ minimum HS-DPCCH power offset, and the HS-DPCCH adjustment step size    │
│ that are corresponding to each cell group in all the cell groups        │
│ of the UE in the multi-flow transmission mode                           │
└─────────────────────────────────────────────────────────────────────────┘
                                    │
                                    ▼
┌─────────────────────────────────────────────────────────────────────────┐
│ With respect to each cell group in all cell groups corresponding to     │  512
│ the UE, the UE obtains a CPICH Ec/N0 measurement value of the cell group│
└─────────────────────────────────────────────────────────────────────────┘
                                    │
                                    ▼
┌─────────────────────────────────────────────────────────────────────────┐
│ The UE determines that among N times the CPICH Ec/N0 measurement value  │
│ is obtained, there are M times the obtained CPICH Ec/N0 measurement     │
│ value is greater than a CPICH Ec/N0 measurement value obtained for a    │  513
│ previous time, and that a difference between a CPICH Ec/N0 measurement  │
│ value obtained for the $N^{th}$ time and a CPICH Ec/N0 measurement value│
│ obtained for the first time is greater than a preset second threshold T2│
└─────────────────────────────────────────────────────────────────────────┘
                                    │
                                    ▼
┌─────────────────────────────────────────────────────────────────────────┐
│ The UE determines whether a current HS-DPCCH power offset of the cell   │
│ group is a minimum power offset in all cell groups, and, if not, reduces│
│ the current HS-DPCCH power offset of the cell group by one HS-DPCCH     │  514
│ adjustment step size, where the HS-DPCCH power offset obtained after    │
│ being reduced by one HS-DPCCH adjustment step size is the second HS-    │
│ DPCCH power offset                                                      │
└─────────────────────────────────────────────────────────────────────────┘
                                    │
                                    ▼
┌─────────────────────────────────────────────────────────────────────────┐
│ If the UE determines that among N times the CPICH Ec/N0 measurement     │  513'
│ value is obtained, there are M times the obtained CPICH Ec/N0           │
│ measurement value is smaller than a CPICH Ec/N0 measurement value       │
│ obtained for a previous time, and that a difference between a CPICH     │
│ Ec/N0 measurement value obtained for the $N^{th}$ time and a CPICH Ec/N0│
│ measurement value obtained for the first time is greater than a preset  │
│ second threshold T2                                                     │
└─────────────────────────────────────────────────────────────────────────┘
                                    │
                                    ▼
┌─────────────────────────────────────────────────────────────────────────┐
│ The UE determines whether a current HS-DPCCH power offset of the cell   │
│ group is the maximum power offset of the cell group, and, if not,       │
│ increases the current HS-DPCCH power offset of the cell group by one    │  514'
│ HS-DPCCH adjustment step size, where the HS-DPCCH power offset obtained │
│ after being increased by one HS-DPCCH adjustment step size is the       │
│ second HS-DPCCH power offset                                            │
└─────────────────────────────────────────────────────────────────────────┘
                                    │
                                    ▼
┌─────────────────────────────────────────────────────────────────────────┐
│ The UE adjusts the current transmit power of the HS-DPCCH according to  │  515
│ the second HS-DPCCH power offset of the cell group                      │
└─────────────────────────────────────────────────────────────────────────┘
```

FIG. 5B

METHOD AND DEVICE FOR POWER CONTROL OF HIGH SPEED DEDICATED PHYSICAL CONTROL CHANNEL

CROSS-REFERENCE TO RELATED APPLICATIONS

This application claims priority to Chinese Patent Application No. 201210551938.3, filed on Dec. 18, 2012, which is hereby incorporated by reference in its entirety.

TECHNICAL FIELD

Embodiments of the present invention relate to communications technologies, and in particular, to a method and a device for power control of a High Speed Dedicated Physical Control Channel (HS-DPCCH).

BACKGROUND

In an R11 version of the Third Generation Partnership Project (3GPP) Wide-band Code Division Multiple Access (WCDMA) system, multiple cells are allowed to send High Speed Downlink Packet Access (HSDPA) data to a User Equipment (UE) simultaneously. That is, the UE implements a Multi-Flow Transmission (MF-Tx) mode to enhance throughput of UEs at the cell edge and downlink throughput performance of the cell.

High Speed Packet Access (HSPA) supports the MF-Tx mode in the R11, that is, the UE at the cell edge can receive High Speed Downlink Shared Channel (HS-DSCH) from multiple cells. Correspondingly, the UE needs to feed back ACK, NACK, and PCI/CQI to each cell. On the 68$^{th}$ session of RAN1, a consensus is reached that a UE uses a joint feedback manner to perform HS-DPCCH feedback. That is, the UE uses a single HS-DPCCH to feed back ACK (Acknowledgment), NACK, and a Channel Quality Indicator (CQI) to each cell.

In a Multi-carrier High Speed Downlink Packet Access (MC-HSDPA) mode (including Dual Carrier (DC), 4C (4 carriers), and 8C (8 carriers)), all cells belong to one NodeB and have the same coverage; when Multi Carrier (MC) is configured for the UE, all cells have basically the same uplink path loss, and therefore, demodulation requirements are met only if all cells of the base station have the same uplink HS-DPCCH power configuration.

In the MF-Tx mode, however, the UE may set up links to multiple NodeBs (NB), and each NodeB has different coverage. In the MF-Tx configuration of the UE, the uplink path loss may differ sharply between the cells (the difference may be up to 6 dB). When the same HS-DPCCH power is configured for all cells, the HS-DPCCH power arriving at the NodeB of a greater uplink path loss is low, which affects decoding performance of the HS-DPCCH on the NodeB and further affects downlink scheduling of the NodeB.

SUMMARY

In view of that, embodiments of the present invention provide a method and a device for power control of an HS-DPCCH to solve an HS-DPCCH receiving performance problem caused by an uplink path loss difference between cells in the prior art.

In a first aspect, an embodiment of the present invention provides a method for power control of an HS-DPCCH, including:

if a UE is in a soft handover state and configured to a multi-flow transmission mode, obtaining, by the UE, a first HS-DPCCH power offset and an HS-DPCCH adjustment step size that are corresponding to each cell group in all cell groups of the UE in the multi-flow transmission mode;

if the UE meets a first preset condition, determining, by the UE, a second HS-DPCCH power offset of the cell group in all cell groups of the UE according to the HS-DPCCH adjustment step size and the first HS-DPCCH power offset; and adjusting, by the UE, current transmit power of the HS-DPCCH according to the second HS-DPCCH power offset of the cell group.

With reference to the first aspect, in a first possible implementation mode, the obtaining, by the UE, a first HS-DPCCH power offset and an HS-DPCCH adjustment step size that are corresponding to each cell group in all cell groups of the UE in the multi-flow transmission mode, includes:

obtaining, by the UE, a maximum HS-DPCCH power offset, a minimum HS-DPCCH power offset, and the HS-DPCCH adjustment step size that are corresponding to each cell group in all the cell groups of the UE in the multi-flow transmission mode.

With reference to the first aspect and the first possible implementation mode, in a second possible implementation mode, the obtaining, by the UE, a maximum HS-DPCCH power offset and a minimum HS-DPCCH power offset that are corresponding to each cell group in all the cell groups of the UE in the multi-flow transmission mode, includes:

receiving, by the UE, control information sent by a Radio Network Controller (RNC) according to information of a serving cell, where the control information includes the maximum HS-DPCCH power offset and the minimum HS-DPCCH power offset that are corresponding to each cell group.

With reference to the first aspect and the first and second possible implementation modes, in a third possible implementation mode, the obtaining, by the UE, the HS-DPCCH adjustment step size corresponding to each cell group in all the cell groups of the UE in the multi-flow transmission mode, includes:

determining, by the UE, the HS-DPCCH adjustment step size according to an adjustment rate currently required by the UE;

or, receiving, by the UE, the HS-DPCCH adjustment step size sent by a network device, where the HS-DPCCH adjustment step size is 1/W times a difference between the maximum HS-DPCCH power offset of the cell group and the minimum HS-DPCCH power offset of the cell group, where W is a natural number greater than or equal to 1.

With reference to the first aspect and the first possible implementation mode, in a fourth possible implementation mode, the determining, by the UE if the UE meets a first preset condition, a second HS-DPCCH power offset of the cell group according to the HS-DPCCH adjustment step size and the first HS-DPCCH power offset, includes:

determining, by the UE, that in M of N power control command combining cycles, a first Transmitted Power Command (TPC) command is greater than 0, and a second TPC command is greater than 0, where the first TPC command is a TPC command obtained by combining TPC commands sent by a radio link set of the cell group, and the second TPC command is a TPC command obtained by the UE by combining TPC commands sent by all radio link sets in an active set; and determining, by the UE, whether a current HS-DPCCH power offset of the cell group is the maximum power offset of the cell group, and, if not, increasing the current HS-DPCCH power offset of the cell group by one HS-DPCCH adjustment step size, where the HS-DPCCH power offset obtained after being increased by one HS-DPCCH adjustment step size is the second HS-DPCCH power offset, where M is greater than N/2, M is less than or equal to N, and N and M are positive integers.

With reference to the first aspect and the fourth possible implementation mode, in a fifth possible implementation mode, if the UE is in a Heterogeneous Network (HetNet), before the determining, by the UE, that in M of N power control command combining cycles, a first TPC command is greater than 0, and a second TPC command is greater than 0, the method further includes:

determining, by the UE, that the cell group belongs to a Macro NodeB.

With reference to the first aspect and the first possible implementation mode, in a sixth possible implementation mode, the determining, by the UE if the UE meets a first preset condition, a second HS-DPCCH power offset of the cell group according to the HS-DPCCH adjustment step size and the first HS-DPCCH power offset, includes:

determining, by the UE, that in each of N power control command combining cycles, the first TPC command is equal to the second TPC command in each power control command combining cycle, and the first TPC command is less than 0 and the second TPC command is less than 0 in P power control command combining cycles, where the first TPC command is a TPC command obtained by combining TPC commands sent by a radio link set of the cell group, and the second TPC command is a TPC command obtained by the UE by combining TPC commands sent by all radio link sets in an active set; and determining, by the UE, whether a current HS-DPCCH power offset of the cell group is a minimum power offset in all cell groups, and, if not, reducing the current HS-DPCCH power offset of the cell group by one HS-DPCCH adjustment step size, where the HS-DPCCH power offset obtained after being reduced by one HS-DPCCH adjustment step size is the second HS-DPCCH power offset, where P is greater than N/2, P is less than or equal to N, and N and P are positive integers.

With reference to the first aspect and the sixth possible implementation mode, in a seventh possible implementation mode, if the UE is in a HetNet, before the determining, by the UE, that in each of N power control command combining cycles, the first TPC command is equal to the second TPC command in each power control command combining cycle, the method further includes:

determining, by the UE, that the cell group belongs to a Macro NodeB.

With reference to the first aspect and the first possible implementation mode, in an eighth possible implementation mode, the determining, by the UE if the UE meets a first preset condition, a second HS-DPCCH power offset of the cell group according to the HS-DPCCH adjustment step size and the first HS-DPCCH power offset, includes:

obtaining, by the UE, a downlink Common Pilot Channel Received Signal Code Power (CPICH RSCP) measurement value of the cell group; and if the UE determines that, among N times the CPICH RSCP measurement value is obtained, there are M times the obtained CPICH RSCP measurement value is greater than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1, determining, by the UE, whether a current HS-DPCCH power offset of the cell group is a minimum power offset in all cell groups, and, if not, reducing the current HS-DPCCH power offset of the cell group by one HS-DPCCH adjustment step size, where the HS-DPCCH power offset obtained after being reduced by one HS-DPCCH adjustment step size is the second HS-DPCCH power offset, where M is greater than N/2, M is less than or equal to N, N and M are positive integers, and a time length required for the UE to obtain the CPICH RSCP measurement values for N times is equal to a time length of N power control command combining cycles.

With reference to the first aspect and the first possible implementation mode, in a ninth possible implementation mode, if the UE is in a HetNet, before the determining, by the UE, that among N times the CPICH RSCP measurement value is obtained, there are M times the obtained CPICH RSCP measurement value is greater than a CPICH RSCP measurement value obtained for a previous time, the method further includes:

determining, by the UE, that the cell group belongs to a Macro NodeB.

With reference to the first aspect and the first possible implementation mode, in a tenth possible implementation mode, the determining, by the UE if the UE meets a first preset condition, a second HS-DPCCH power offset of the cell group according to the HS-DPCCH adjustment step size and the first HS-DPCCH power offset, includes:

obtaining, by the UE, a CPICH RSCP measurement value of the cell group; and if the UE determines that among N times the CPICH RSCP measurement value is obtained, there are M times the obtained CPICH RSCP measurement value is smaller than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1, determining, by the UE, whether a current HS-DPCCH power offset of the cell group is the maximum power offset of the cell group, and, if not, increasing the current HS-DPCCH power offset of the cell group by one HS-DPCCH adjustment step size, where the HS-DPCCH power offset obtained after being increased by one HS-DPCCH adjustment step size is the second HS-DPCCH power offset, With reference to the first aspect and the first possible implementation mode, in an eleventh possible implementation mode, the determining, by the UE if the UE meets a first preset condition, a second HS-DPCCH power offset of the cell group according to the HS-DPCCH adjustment step size and the first HS-DPCCH power offset, includes:

obtaining, by the UE, a CPICH Ec/N0 measurement value of the cell group;

if the UE determines that among N times the CPICH Ec/N0 measurement value is obtained, there are M times the obtained CPICH Ec/N0 measurement value is greater than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2, determining, by the UE, whether a current HS-DPCCH power offset of the cell group is a minimum power offset in all cell groups, and, if not, reducing the current HS-DPCCH power offset of the cell group by one HS-DPCCH adjustment step size, where the HS-DPCCH power offset obtained after being reduced by one HS-DPCCH adjustment step size is the second HS-DPCCH power offset, where M is greater than N/2, N and M are positive integers, and a time length required for the UE to obtain the CPICH Ec/N0 measurement value for N times is equal to a time length of N power control command combining cycles, where M is greater than N/2, M is less than or equal to N, and N and M are positive integers.

With reference to the first aspect and the first possible implementation mode, in a twelfth possible implementation mode, the determining, by the UE if the UE meets a first preset condition, a second HS-DPCCH power offset of the cell group according to the HS-DPCCH adjustment step size and the first HS-DPCCH power offset, includes:

obtaining, by the UE, a CPICH Ec/N0 measurement value of the cell group; and if the UE determines that among N times the CPICH Ec/N0 measurement value is obtained, there are M times the obtained CPICH Ec/N0 measurement value is smaller than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2, determining, by the UE, whether a current HS-DPCCH power offset of the cell group is the maximum power offset of the cell group, and, if not, increasing the current HS-DPCCH power offset of the cell group by one HS-DPCCH adjustment step size, where the HS-DPCCH power offset obtained after being increased by one HS-DPCCH adjustment step size is the second HS-DPCCH power offset, where M is greater than N/2, M is less than or equal to N, and N and M are positive integers.

With reference to the first aspect and the eleventh possible implementation modes, in a thirteenth possible implementation mode, if the UE is in a HetNet, before the determining, by the UE, that among N times the CPICH Ec/N0 measurement value is obtained, there are M times the obtained CPICH Ec/N0 measurement value is greater than a CPICH Ec/N0 measurement value obtained for a previous time, the method further includes:

determining, by the UE, that the cell group belongs to a Macro NodeB.

With reference to the first aspect and the fourth, sixth, eighth, tenth, eleventh, or twelfth possible implementation mode, in a fourteenth possible implementation mode, if the cell group is a cell group newly configured or newly activated by the UE, an initial value of the current HS-DPCCH power offset of the cell group is the maximum HS-DPCCH power offset corresponding to the cell group.

With reference to the first aspect and the above possible implementation modes, in a fifteenth possible implementation mode, the cell group includes more than one cell.

With reference to the first aspect and the above possible implementation modes, in a sixteenth possible implementation mode, if the UE is in a soft handover state and is not configured to a multi-flow transmission mode, the method further comprises:

obtaining, by the UE, a third HS-DPCCH power offset and another HS-DPCCH adjustment step size that are corresponding to a current serving cell of the UE;

if the UE meets a second preset condition, determining, by the UE, a fourth HS-DPCCH power offset of the current serving cell according to the another HS-DPCCH adjustment step size and the third HS-DPCCH power offset; and adjusting, by the UE, the current transmit power of the HS-DPCCH according to the fourth HS-DPCCH power offset of the current serving cell.

With reference to the first aspect and the sixteenth possible implementation mode, in a seventeenth possible implementation mode, the obtaining, by the UE, a third HS-DPCCH power offset and another HS-DPCCH adjustment step size that are corresponding to a current serving cell of the UE, includes:

obtaining, by the UE, the maximum HS-DPCCH power offset, the minimum HS-DPCCH power offset, and the another HS-DPCCH adjustment step size that are corresponding to the current serving cell of the UE.

With reference to the first aspect and the seventeenth possible implementation mode, in an eighteenth possible implementation mode, the obtaining, by the UE, another HS-DPCCH adjustment step size corresponding to a current serving cell of the UE, includes:

determining, by the UE, the another HS-DPCCH adjustment step size according to an adjustment rate currently required by the UE;

or, receiving, by the UE, the another HS-DPCCH adjustment step size sent by a network device;

where the another HS-DPCCH adjustment step size is 1/P times a difference between the maximum HS-DPCCH power offset corresponding to the serving cell and the minimum HS-DPCCH power offset corresponding to the serving cell, where P is a natural number greater than or equal to 1.

With reference to the first aspect and the seventeenth or eighteenth possible implementation mode, in a nineteenth possible implementation mode, the determining, by the UE if the UE meets a second preset condition, a fourth HS-DPCCH power offset of the serving cell according to the another HS-DPCCH adjustment step size and the third HS-DPCCH power offset, includes:

determining, by the UE, that in M of N power control command combining cycles, a first TPC command is greater than 0, and a second TPC command is greater than 0, where the first TPC command is a TPC command obtained by combining TPC commands sent by a radio link set of the serving cell, and the second TPC command is a TPC command obtained by the UE by combining TPC commands sent by all radio link sets in an active set; and determining, by the UE, whether a current HS-DPCCH power offset of the serving cell is the maximum power offset of the serving cell, and, if not, increasing the current HS-DPCCH power offset of the serving cell by the another HS-DPCCH adjustment step size, where the HS-DPCCH power offset obtained after being increased by the another HS-DPCCH adjustment step size is the fourth HS-DPCCH power offset, or, determining, by the UE, that in each of N power control command combining cycles, the first TPC command is equal to the second TPC command in each power control command combining cycle, and the first TPC command is less than 0 and the second TPC command is less than 0 in P power control command combining cycles, where the first TPC command is a TPC command obtained by combining TPC commands sent by a radio link set of the serving cell, and the second TPC command is a TPC command obtained by the UE by combining TPC commands sent by all radio link sets in an active set; and determining, by the UE, whether a current HS-DPCCH power offset of the serving cell is the minimum power offset of the serving cell, and, if not, reducing the current HS-DPCCH power offset of the serving cell by the another HS-DPCCH adjustment step size, where the HS-DPCCH power offset obtained after being reduced by the another HS-DPCCH adjustment step size is the fourth HS-DPCCH power offset, where M is greater than N/2, M is less than or equal to N, P is greater than N/2, P is less than or equal to N, and N, M, and P are positive integers.

With reference to the first aspect and the seventeenth or eighteenth possible implementation mode, in a twentieth possible implementation mode, the determining, by the UE if the UE meets a second preset condition, a fourth HS-DPCCH power offset of the serving cell according to the another HS-DPCCH adjustment step size and the third HS-DPCCH power offset, includes:

obtaining, by the UE, a CPICH RSCP measurement value of the serving cell, and, if the UE determines that among N times the CPICH RSCP measurement value is obtained, there are M times the obtained CPICH RSCP measurement value is greater than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1, determining, by the UE, whether a current HS-DPCCH power offset of the serving cell is the minimum power offset of the serving cell, and, if not, reducing the current HS-DPCCH power offset of the serving cell by the another HS-DPCCH adjustment step size, where the HS-DPCCH power offset obtained after being reduced by the another HS-DPCCH adjustment step size is the fourth HS-DPCCH power offset, or, obtaining, by the UE, a CPICH RSCP measurement value of the serving cell, and, if the UE determines that among N times the CPICH RSCP measurement value is obtained, there are M times the obtained CPICH RSCP measurement value is smaller than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1, determining, by the UE, whether a current HS-DPCCH power offset of the serving cell is the maximum power offset of the serving cell, and, if not, increasing the current HS-DPCCH power offset of the serving cell by the another HS-DPCCH adjustment step size, where the HS-DPCCH power offset obtained after being increased by the another HS-DPCCH adjustment step size is the fourth HS-DPCCH power offset, where M is greater than N/2, M is less than or equal to N, N and M are positive integers, and a time length required for the UE to obtain the CPICH RSCP measurement value for N times is equal to a time length of N power control command combining cycles.

With reference to the first aspect and the seventeenth or eighteenth possible implementation mode, in a twenty-first possible implementation mode, the determining, by the UE if the UE meets a second preset condition, a fourth HS-DPCCH power offset of the serving cell according to the another HS-DPCCH adjustment step size and the third HS-DPCCH power offset, includes:

obtaining, by the UE, a CPICH Ec/N0 measurement value of the serving cell, and, if the UE determines that among N times the CPICH Ec/N0 measurement value is obtained, there are M times the obtained CPICH Ec/N0 measurement value is greater than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2, determining, by the UE, whether a current HS-DPCCH power offset of the serving cell is the minimum power offset of all serving cells, and, if not, reducing the current HS-DPCCH power offset of the serving cell by the another HS-DPCCH adjustment step size, where the HS-DPCCH power offset obtained after being reduced by the another HS-DPCCH adjustment step size is the fourth HS-DPCCH power offset, or, obtaining, by the UE, a CPICH Ec/N0 measurement value of the serving cell, and, if the UE determines that among N times the CPICH Ec/N0 measurement value is obtained, there are M times the obtained CPICH Ec/N0 measurement value is smaller than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2, determining, by the UE, whether a current HS-DPCCH power offset of the serving cell is the maximum power offset of the serving cell, and, if not, increasing the current HS-DPCCH power offset of the serving cell by the another HS-DPCCH adjustment step size, where the HS-DPCCH power offset obtained after being increased by the another HS-DPCCH adjustment step size is the fourth HS-DPCCH power offset, where M is greater than N/2, N and M are positive integers, and a time length required for the UE to obtain the CPICH Ec/N0 measurement value for N times is equal to a time length of N power control command combining cycles.

With reference to the first aspect and the above possible implementation modes, in a twenty-second possible implementation mode, the method further includes: if the UE is not in a soft handover state, using, by the UE, a current second HS-DPCCH power offset fixedly as the minimum HS-DPCCH power offset corresponding to the serving cell of the UE; and adjusting, by the UE, current transmit power of the HS-DPCCH according to the second HS-DPCCH power offset.

In a second aspect, an embodiment of the present invention provides a UE, including:

an obtaining unit, configured to: if a UE is in a soft handover state and configured to a multi-flow transmission mode, obtain a first HS-DPCCH power offset and an HS-DPCCH adjustment step size that are corresponding to each cell group in all cell groups of the UE in the multi-flow transmission mode;

a determining unit, configured to: if the UE meets a first preset condition, determine a second HS-DPCCH power offset of the cell group in all cell groups of the UE according to the HS-DPCCH adjustment step size and the first HS-DPCCH power offset; and an adjusting unit, configured to adjust current transmit power of an HS-DPCCH according to the second HS-DPCCH power offset of the cell group.

With reference to the second aspect, in a first possible implementation mode, the obtaining unit is specifically configured to:

if the UE is in a soft handover state and configured to a multi-flow transmission mode, obtain a maximum HS-DPCCH power offset, a minimum HS-DPCCH power offset, and the HS-DPCCH adjustment step size that are corresponding to each cell group in all the cell groups of the UE in the multi-flow transmission mode.

With reference to the second aspect, in a second possible implementation mode, the obtaining unit is further configured to obtain a third HS-DPCCH power offset and another HS-DPCCH adjustment step size that are corresponding to a current serving cell of the UE if the UE is in a soft handover state and not configured to a multi-flow transmission mode;

the determining unit is further configured to: if the UE meets a second preset condition, determine a fourth HS-DPCCH power offset of the current serving cell according to the another HS-DPCCH adjustment step size and the third HS-DPCCH power offset; and the adjusting unit is further configured to adjust the current transmit power of the HS-DPCCH according to the fourth HS-DPCCH power offset of the current serving cell.

As seen from the foregoing technical solutions, as regards the method and the device for power control of an HS-DPCCH in the embodiments of the present invention, when the UE is in a soft handover state and configured to a multi-flow transmission mode, the UE obtains a first HS-DPCCH power offset and an HS-DPCCH adjustment step size that are corresponding to each cell group, and, when the UE meets a first preset condition, the UE determines a second HS-DPCCH power offset of the cell group according to the HS-DPCCH adjustment step size and the first HS-DPCCH power offset, and adjusts the current transmit power of the HS-DPCCH according to the obtained second HS-DPCCH power offset. This solves the HS-DPCCH receiving performance problem caused by an uplink path loss difference between cells in the prior art.

BRIEF DESCRIPTION OF DRAWINGS

To illustrate the technical solutions of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 5A and FIG. 5B are a schematic flowchart of a method for power control of an HS-DPCCH according to another embodiment of the present invention;

DESCRIPTION OF EMBODIMENTS

To make the objectives, technical solutions, and advantages of the present invention more comprehensible, the following clearly describes the technical solutions in the embodiments of the present invention with reference to the accompanying drawings in the embodiments of the present invention. Apparently, the described embodiments are merely a part of the embodiments of the present invention. Based on the following embodiments of the present invention, persons of ordinary skill in the art may obtain other embodiments used to solve the technical issue of the present invention and achieve the technical effect of the present invention by making equivalent changes to some or all technical features, without any creative effort, where the equivalent changes evidently fall within the scope of the present invention.

Figure 1:
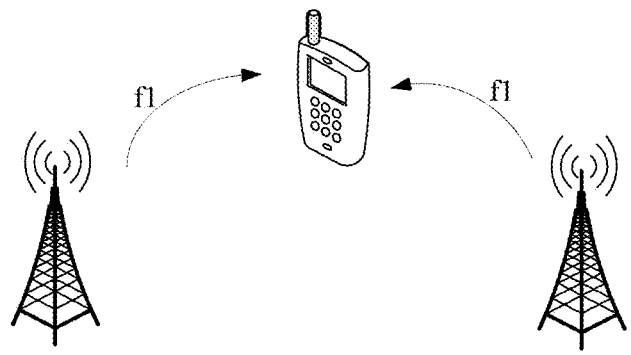
FIG. 1 is a schematic diagram of a single-frequency dual-cell application scenario in the prior art.

FIG. 1 shows a Single-Frequency Dual-Cell (SF-DC) scenario in the prior art. In FIG. 1, a UE at a cell edge can receive HS-DSCHs from multiple cells, and correspondingly, the UE uses a single HS-DPCCH to feed back ACK, NACK, and CQI of each cell.

However, when the UE is configured to an MF-Tx mode, increasing a power offset of the HS-DPCCH relative to a DPCCH, $\Delta_{ACK}$, $\Delta_{NACK}$, or $\Delta_{CQI}$, can improve the HS-DPCCH receiving reliability of each cell in the MF-Tx mode. However, in such a practice, the same HS-DPCCH power offset $\Delta_{ACK}$, $\Delta_{NACK}$, or $\Delta_{CQI}$ is set for all cells in the MF-Tx mode, regardless of the uplink path loss difference between the cells. The power of the HS-DPCCH fed back by the UE to different cells varies, which leads to demodulation performance difference between the cells. If the highest HS-DPCCH power offset is set for all cells, the demodulation requirement of the cell of the highest path loss is met, but power waste is brought to other cells of lower path losses.

Besides, to meet user requirements and meet challenges of other technologies, the WCDMA system may set up a Heterogeneous Network (HetNet) in a Heterogeneous networking mode. The heterogeneous network is networked by a Macro NodeB of large coverage and a Pico NodeB of small coverage.

Downlink coverage of a cell depends on downlink transmit power of the cell. The benefit brought by the HetNet is increase of cell throughput and decrease of costs. Specially, the cost of a HetNet is lower than the cost of a full-Macro homogeneous network (Homonet).

Figure 2:
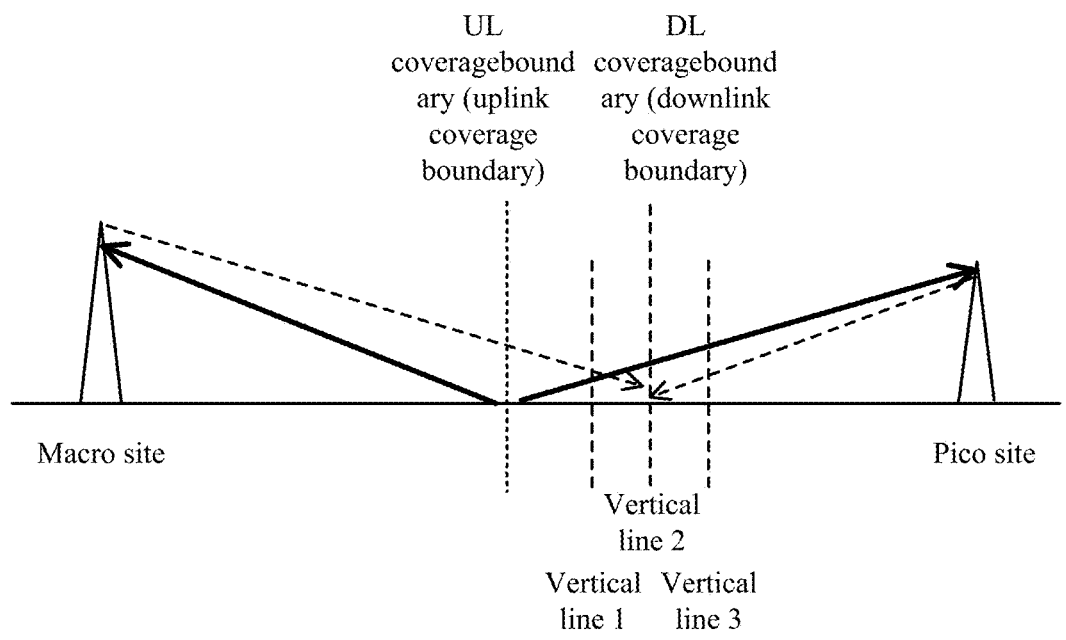
FIG. 2 is a schematic diagram of an application scenario of a heterogeneous network in the prior art.

In a heterogeneous network scenario, an uplink power balance point is different from a downlink power balance point, that is, a point where the downlink power from a Macro NodeB to the UE is the same as the downlink power from a Pico NodeB to the UE, is different from a point where the uplink power from the UE to the Macro NodeB is the same as the uplink power from the UE to the Pico NodeB, as shown in FIG. 2. On vertical line 1 on the left side, the UE reports a 1a event of adding a pico cell into an active set (that has set up an RL with the cell), or a 1b event of removing the pico cell from the active set; on vertical line 3 on the right side, the UE reports a 1a event of adding a macro cell into the active set, or a 1b event of removing the macro cell from the active set. The region between vertical line 1 and vertical line 3 is a soft handover region (for ease of description, it is assumed that a threshold of the 1a event is the same as a threshold of the 1b event). Vertical line 2 in the middle is a downlink balance point of the macro cell and the pico cell, and, in this case, the UE reports a 1d event of change of a best downlink cell. It should be understood that the 1a event is used to add a cell into the active set, and, when a cell outside the active set is better than a report range, the 1a event is triggered; the 1b event is used to remove a cell from the active set, and, when a cell inside the active set is worse than the report range, the 1b event is triggered; a 1c event is used to substitute a cell outside the active set for a cell in the active set, and, when a cell outside the active set is better than a cell in the active set, the 1c event is triggered; and, the 1d event is used to update the best cell in the active set, and, when the best cell changes, the 1d event is triggered.

If the UE is not configured to an MF-Tx mode, when the UE is located in a part of the soft handover region of the Macro NodeB and the Pico NodeB (the region between vertical line 1 and vertical line 2) and the serving NodeB of the downlink HSDPA is a Macro NodeB, the transmit power of the Uplink Dedicated Physical Control Channel (UL-DPCCH) of the UE decreases as controlled by the Pico NodeB. Because a power offset exists between a DPCCH and an HS-DPCCH that is a feedback channel of the HSDPA, the power from the HS-DPCCH to the Macro NodeB is relatively small, and the demodulation performance of the Macro NodeB is low, which affects downlink HSDPA scheduling for the UE.

If the UE is configured to an MF-Tx mode, the UE will suffer such a problem in the whole soft handover region of the Macro NodeB and the Pico NodeB.

Currently, when the UE is in the soft handover region, multiple cells estimate an SIR of an UL-DPCCH of the UE and feed back a Transmitted Power Command (TPC). The UE combines received TPC soft values (measuring reliability of a TPC command) attributable to the same radio link set (a set of links set up between the UE and one NodeB), and then combines the TPC soft values of all radio link sets to obtain a current TPC command, and then adjusts the transmit power of the DPCCH according to the current TPC command. In this way, in a soft handover, the transmit power of the DPCCH of the UE is not adjusted according to the TPC command of a cell, but is adjusted according to the TPC commands of multiple cells.

The transmit power of the HS-DPCCH varies with the transmit power of the DPCCH, and a power offset $\Delta_{ACK}$, $\Delta_{NACK}$, or $\Delta_{CQI}$ exists between the HS-DPCCH and the DPCCH, where the power offset $\Delta_{ACK}$, $\Delta_{NACK}$, or $\Delta_{CQI}$ is delivered from a network side.

However, to improve HS-DPCCH receiving reliability of a macro cell, it is necessary to increase the power offset of the HS-DPCCH relative to the DPCCH, namely, $\Delta_{ACK}$, $\Delta_{NACK}$, or $\Delta_{CQI}$. That is, if the highest HS-DPCCH power offset is set for all cells, the demodulation requirement of the cell of the highest path loss is met, but power waste is brought to other cells of lower path losses.

In the embodiment of the present invention, the UE is also known as terminal, Mobile Station (MS), mobile terminal, and so on; and may communicate with one or more core networks through a Radio Access Network (RAN). For example, the UE may be a mobile phone (or called a "cellular" phone), or a computer with a mobile terminal, such as a mobile device that is portable, pocket-sized, handheld, built in a computer, or mounted in a vehicle. They exchange voice and/or data with the radio access network.

In the embodiment of the present invention, the network device may be a NodeB in a WCDMA system. Further, understandably, in the embodiment of the present invention, the network device may be another device capable of demodulation, which shall not be construed as a limitation on the present invention.

For ease of description, the following embodiment takes a WCDMA system and a UE as examples, and assumes that the network device includes a base station, which, however, shall not be construed as a limitation on the present invention.

Figure 3:
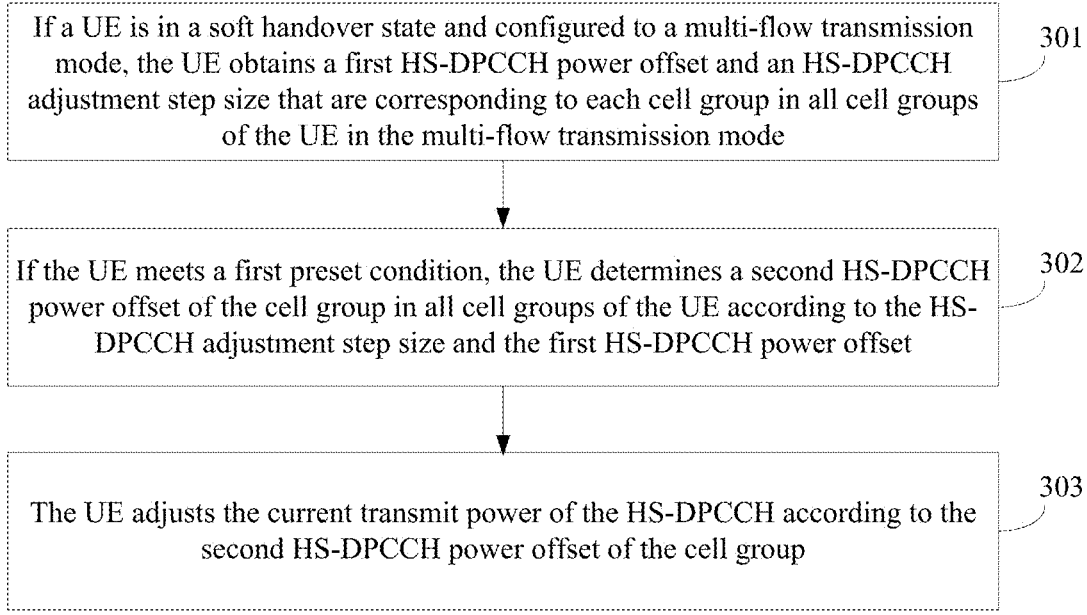
FIG. 3 is a schematic flowchart of a method for power control of an HS-DPCCH according to an embodiment of the present invention.

FIG. 3 shows a flowchart of a method for power control of an HS-DPCCH according to an embodiment of the present invention. As shown in FIG. 3, the method for power control of the HS-DPCCH in this embodiment is described below.

301. If a UE is in a soft handover state and configured to an MF-Tx mode, the UE obtains a first HS-DPCCH power offset and an HS-DPCCH adjustment step size that are corresponding to each cell group in all cell groups of the UE in the multi-flow transmission mode. For example, a cell group refers to a group of cells in a multi-flow transmission mode, and, if they have the same Common Pilot Channel (CPICH) time sequence, the cells make up a cell group, and all cells in the cell group feed back the CQI in the same subframe together.

In the above step, all cell groups indicate that: in the multi-flow transmission mode, the UE receives data of each cell group in all cell groups of the UE, that is, the UE interacts with each cell group in all the cell groups.

It should be noted that in the present invention, a network device configures the UE to the multi-flow transmission mode.

302. If the UE meets a first preset condition, the UE determines a second HS-DPCCH power offset of the cell group in all cell groups of the UE according to the HS-DPCCH adjustment step size and the first HS-DPCCH power offset.

For example, the first preset condition may be: the UE in the cell group determines whether both a first TPC command and a second TPC command in M of N power control command combining cycles are greater than 0, where the first TPC command is a TPC command obtained by combining TPC commands sent by a radio link set of the cell group, and the second TPC command is a TPC command obtained by the UE by combining TPC commands sent by all radio link sets in an active set;

or, the first preset condition may be: the UE in the cell group determines whether, among N downlink Common Pilot Channel Received Signal Code Power (CPICH RSCP) measurement values, M CPICH RSCP measurement values are greater than a previous CPICH RSCP measurement value, and whether a difference between a CPICH RSCP measurement value obtained for the $N^{th}$ time and a CPICH RSCP measurement value obtained for the first time is greater than a preset first threshold T1, or, the first preset condition may be: the UE in the cell group determines whether, among N times the CPICH Ec/N0 measurement value is obtained, there are M times the obtained CPICH Ec/N0 measurement value is greater than a CPICH Ec/N0(Ec/N0 is a ratio of the CPICH RSCP to the total receive power) measurement value obtained for a previous time, and whether a difference between a CPICH Ec/N0 measurement value obtained for the $N^{th}$ time and a CPICH Ec/N0 measurement value obtained for the first time is greater than a preset second threshold T2, where M is greater than N/2, N and M are positive integers, and a time length required for the UE to obtain the CPICH RSCP measurement value for N times or CPICH Ec/N0 measurement values is equal to a time length of N power control command combining cycles.

In addition, in this embodiment, the length of a power control command combining cycle may be a timeslot; in a power control command combining cycle, the UE obtains a TPC command, and, if multiple TPCs are received in a power control command combining cycle, the UE combines the TPCs.

Generally, a set of all links of a UE is an active set, and a set of links that are set up between a UE and a NodeB is called a radio link set. An active set may include one or more radio link sets.

303. The UE adjusts current transmit power of the HS-DPCCH according to the second HS-DPCCH power offset of the cell group.

Therefore, the UE can send signals by using the adjusted HS-DPCCH, which solves the HS-DPCCH receiving performance problem caused by an uplink path loss difference between cells in the prior art.

In addition, it should be noted that, the cell group in this embodiment may include one or more cells.

For example, under SF-DC, two cells exist, and the UE feeds back the CQI to the two cells, and parameters such as power offset and adjustment step size need to be configured for the two cells. In this case, each cell group includes one cell.

Under DF-4C, as shown in Table 1: cells C1 and C2 are in one cell group, cells C3 and C4 are in one cell group, the timeslot format of the HS-DPCCH is shown in Table 1. In this case, the ACKs/NACKs and the CQIs of the two cell groups are sent at different time. Therefore, different ACKs, NACKs, and CQIs may be configured for the two cells. In this case, each two cell group includes two cells.

TABLE 1

| A/N | A/N | CQI | CQI | A/N | A/N | CQI | CQI |
|-----|-----|-----|-----|-----|-----|-----|-----|
| C1 C2 | C3 C4 | C1 | C2 | C1 C2 | C3 C4 | C3 | C4 |

As seen from the above embodiment, as regards the method for power control of an HS-DPCCH in this embodiment, when the UE is in a soft handover state and configured to a multi-flow transmission mode, the UE obtains a first HS-DPCCH power offset and an HS-DPCCH adjustment step size that are corresponding to each cell group, and, when the UE meets a first preset condition, the UE determines a second HS-DPCCH power offset of the cell group according to the HS-DPCCH adjustment step size and the first HS-DPCCH power offset, and adjusts the current transmit power of the HS-DPCCH according to the obtained second HS-DPCCH power offset. This solves the HS-DPCCH receiving performance problem caused by an uplink path loss difference between cells in the prior art.

In an optional application scenario, the step of "the UE obtaining a first HS-DPCCH power offset and an HS-DPCCH adjustment step size that are corresponding to each cell group in all cell groups of the UE in the multi-flow transmission mode" in step 301 may include:

obtaining, by the UE, a maximum HS-DPCCH power offset, a minimum HS-DPCCH power offset, and the HS-DPCCH adjustment step size that are corresponding to each cell group in all the cell groups of the UE in the multi-flow transmission mode.

That is, the first HS-DPCCH power offset may include a maximum HS-DPCCH power offset and a minimum HS-DPCCH power offset.

Preferably, the obtaining, by the UE, a maximum HS-DPCCH power offset and a minimum HS-DPCCH power offset that are corresponding to each cell group in all the cell groups of the UE in the multi-flow transmission mode, may include:

receiving, by the UE, control information sent by an RNC according to information of a serving cell, where the control information includes the maximum HS-DPCCH power offset and the minimum HS-DPCCH power offset that are corresponding to each cell group.

For example, in a Homonet, the maximum power offset of each macro cell may be set to the same value, and may be set according to a soft handover threshold.

In a HetNet, a Radio Network Controller (RNC) sets the maximum power offset of each cell according to a difference between the transmit power of the Pico NodeB and the Macro NodeB. For example, if the transmit power of the Pico NodeB is smaller than that of the Macro NodeB to a larger extent, the maximum power offset of the Macro NodeB needs to be set to a larger value.

The minimum HS-DPCCH power offset value is set according to performance of the base station demodulating the HS-DPCCH in a non-soft handover mode, and the minimum HS-DPCCH power offset of each cell group may be set as equal.

In another optional application scenario, the step of "the UE obtaining an HS-DPCCH adjustment step size corresponding to each cell group in all cell groups of the UE in the multi-flow transmission mode" in step 301 may include:

determining, by the UE, the HS-DPCCH adjustment step size according to an adjustment rate currently required by the UE;

or, receiving, by the UE, the HS-DPCCH adjustment step size sent by a network device, where, the HS-DPCCH adjustment step size is 1/W times a difference between the maximum HS-DPCCH power offset of the cell group and the minimum HS-DPCCH power offset of the cell group, where W is a natural number greater than or equal to 1. For example, W here may be 1, 2, 3, 4, 5, and so on. In other embodiments, W may be any value greater than 1.

Figure 4A:
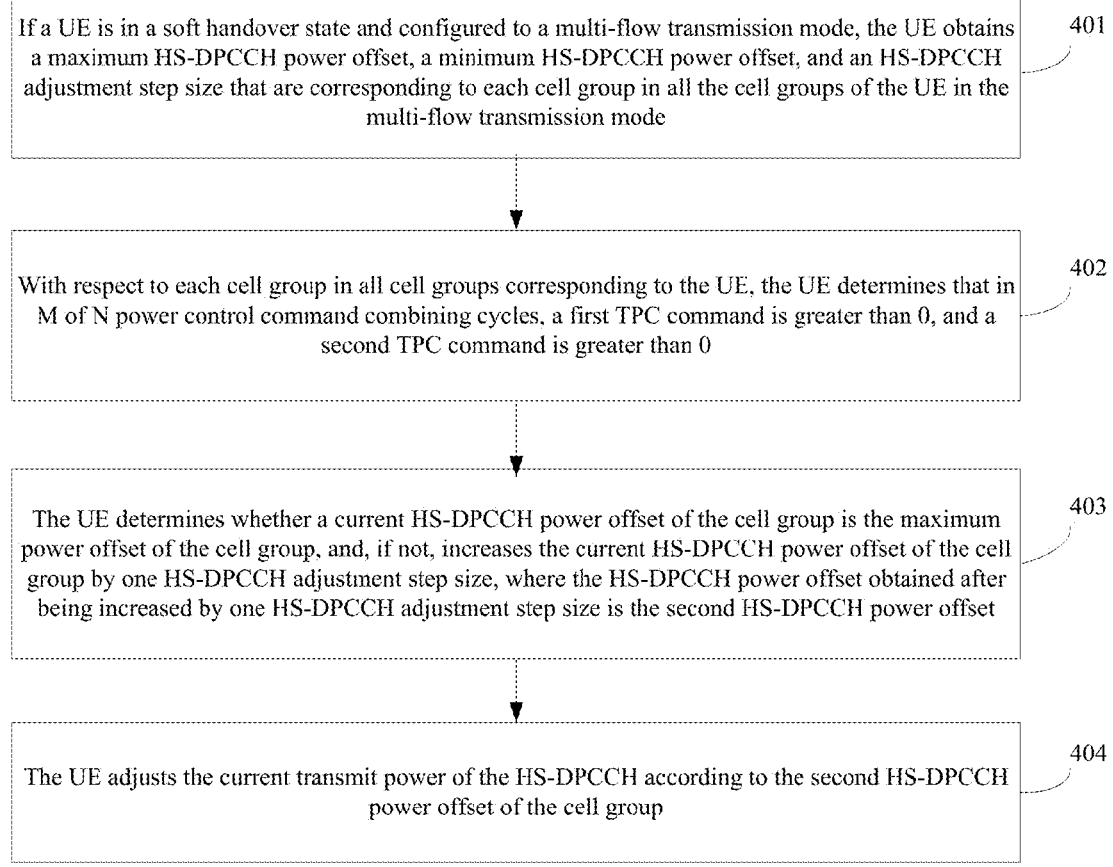
FIG. 4A and FIG. 4B are a schematic flowchart of a method for power control of an HS-DPCCH according to another embodiment of the present invention.

FIG. 4A shows a flowchart of a method for power control of an HS-DPCCH according to an embodiment of the present invention. As shown in FIG. 4A, the method for power control of the HS-DPCCH in this embodiment is described below.

401. If the UE is in a soft handover state and configured to a multi-flow transmission mode, the UE obtains a maximum HS-DPCCH power offset, a minimum HS-DPCCH power offset, and the HS-DPCCH adjustment step size that are corresponding to each cell group in all the cell groups of the UE in the multi-flow transmission mode.

402. With respect to each cell group in all cell groups corresponding to the UE, the UE determines that in M of N power control command combining cycles, a first TPC command is greater than 0, and a second TPC command is greater than 0, where the first TPC command is a TPC command obtained by combining TPC commands sent by a radio link set of the cell group, and the second TPC command is a TPC command obtained by the UE by combining TPC commands sent by all radio link sets in an active set.

403. The UE determines whether a current HS-DPCCH power offset of the cell group is the maximum power offset of the cell group, and, if not, increases the current HS-DPCCH power offset of the cell group by one HS-DPCCH adjustment step size, where the HS-DPCCH power offset obtained after being increased by one HS-DPCCH adjustment step size is the second HS-DPCCH power offset, where M is greater than N/2, M is less than or equal to N, and N and M are positive integers.

For example, if the cell group is a cell group newly configured or newly activated by the UE, an initial value of the current HS-DPCCH power offset of the cell group is the maximum HS-DPCCH power offset corresponding to the cell group.

If a serving cell group is a serving cell that exists when the UE is not in a multi-flow transmission mode and after the UE is configured to a multi-flow transmission mode, the original power offset remains as the current HS-DPCCH power offset of the serving cell.

404. The UE adjusts current transmit power of the HS-DPCCH according to the second HS-DPCCH power offset of the cell group.

The method for power control of an HS-DPCCH in this embodiment solves the HS-DPCCH receiving performance problem caused by an uplink path loss difference between cells in the prior art.

In another application scenario, if the UE is in a HetNet, before the UE determines that in M of N power control command combining cycles, a first TPC command is greater than 0, and a second TPC command is greater than 0, the method further includes:

determining, by the UE, that the cell group belongs to a Macro NodeB, where M is greater than N/2, M is less than or equal to N, and N and M are positive integers.

Understandably, if the UE determines that the cell group does not belong to a Macro NodeB, the UE determines that the cell group belongs to a Pico NodeB, and therefore, the UE uses the second HS-DPCCH power offset corresponding to the cell group as the minimum HS-DPCCH power offset fixedly.

As seen from the above embodiment, the method for power control of an HS-DPCCH in this embodiment adjusts the current transmit power of the HS-DPCCH according to the obtained second HS-DPCCH power offset, which solves the HS-DPCCH receiving performance problem caused by an uplink path loss difference between cells in the prior art.

Figure 4B:
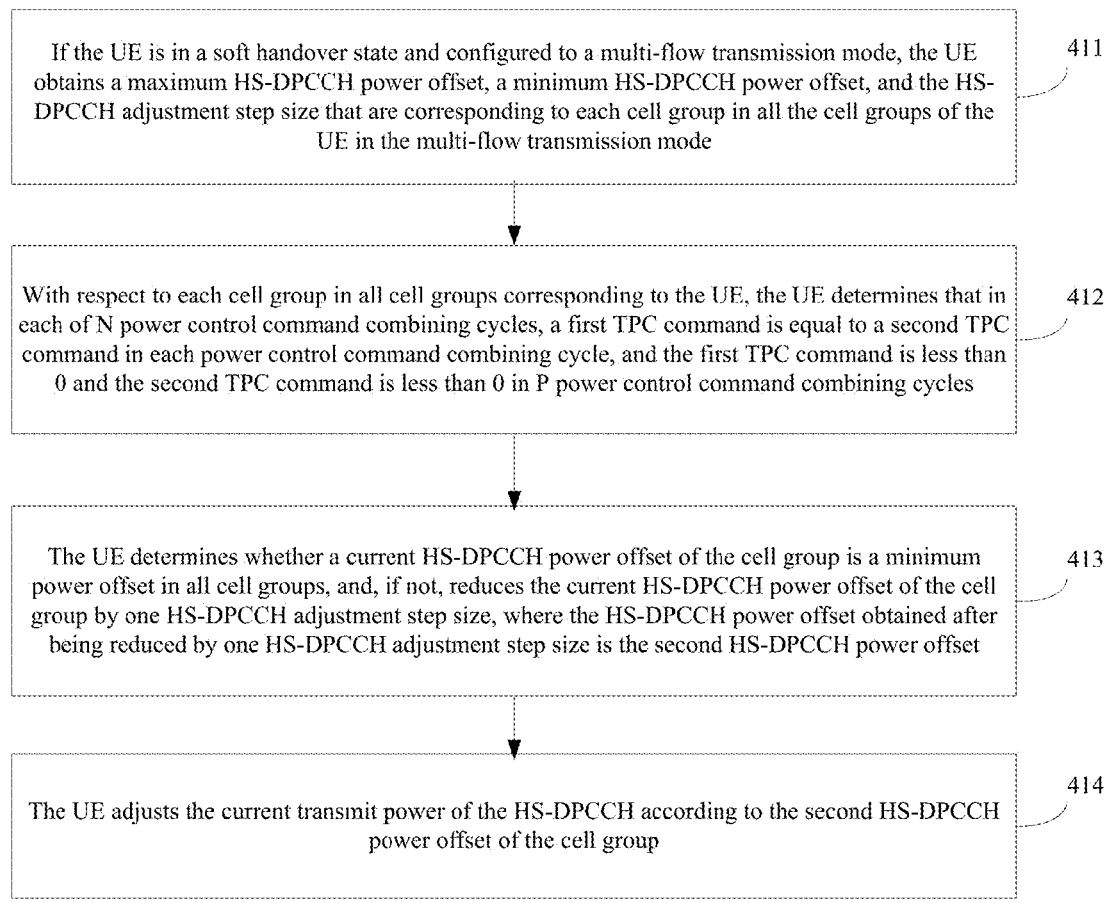

FIG. 4B shows a flowchart of a method for power control of an HS-DPCCH according to an embodiment of the present invention. As shown in FIG. 4B, the method for power control of the HS-DPCCH in this embodiment is described below.

411. If the UE is in a soft handover state and configured to a multi-flow transmission mode, the UE obtains a maximum HS-DPCCH power offset, a minimum HS-DPCCH power offset, and the HS-DPCCH adjustment step size that are corresponding to each cell group in all the cell groups of the UE in the multi-flow transmission mode.

412. With respect to each cell group in all cell groups corresponding to the UE, the UE determines that in each of N power control command combining cycles, a first TPC command is equal to a second TPC command in each power control command combining cycle, and the first TPC command is less than 0 and the second TPC command is less than 0 in P power control command combining cycles, where the first TPC command is a TPC command obtained by combining TPC commands sent by a radio link set of the cell group, and the second TPC command is a TPC command obtained by the UE by combining TPC commands sent by all radio link sets in an active set, where P is greater than N/2, P is less than or equal to N, and N and P are positive integers.

413. The UE determines whether a current HS-DPCCH power offset of the cell group is a minimum power offset in all cell groups, and, if not, reduces the current HS-DPCCH power offset of the cell group by one HS-DPCCH adjustment step size, where the HS-DPCCH power offset obtained after being reduced by one HS-DPCCH adjustment step size is the second HS-DPCCH power offset.

For example, if the cell group is a cell group newly configured or newly activated by the UE, an initial value of the current HS-DPCCH power offset of the cell group is the maximum HS-DPCCH power offset corresponding to the cell group.

If a serving cell group is a serving cell that exists when the UE is not in a multi-flow transmission mode and after the UE is configured to a multi-flow transmission mode, the original power offset remains as the current HS-DPCCH power offset of the serving cell.

414. The UE adjusts current transmit power of the HS-DPCCH according to the second HS-DPCCH power offset of the cell group.

The method for power control of an HS-DPCCH in this embodiment solves the HS-DPCCH receiving performance problem caused by an uplink path loss difference between cells in the prior art.

In another application scenario, if the UE is in a HetNet, before the UE determines that in each of N power control command combining cycles, the first TPC command is equal to the second TPC command in each power control command combining cycle, the method further includes:

determining, by the UE, that the cell group belongs to a Macro NodeB.

As seen from the above embodiment, the method for power control of an HS-DPCCH in this embodiment adjusts the current transmit power of the HS-DPCCH according to the obtained second HS-DPCCH power offset, which solves the HS-DPCCH receiving performance problem caused by an uplink path loss difference between cells in the prior art.

Figure 5A:
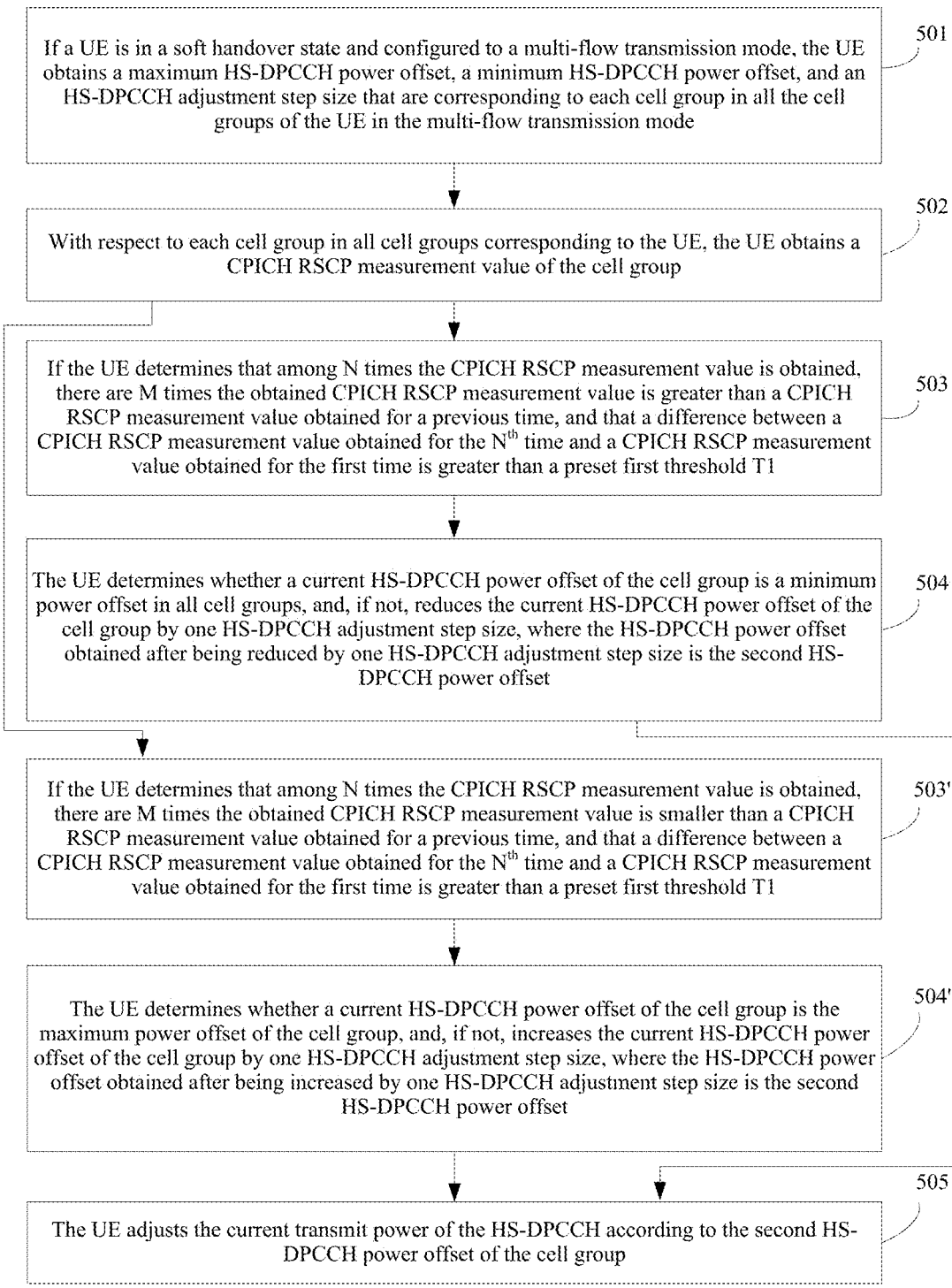

FIG. 5A shows a flowchart of a method for power control of an HS-DPCCH according to an embodiment of the present invention. As shown in FIG. 5A, the method for power control of the HS-DPCCH in this embodiment is described below.

501. If the UE is in a soft handover state and configured to a multi-flow transmission mode, the UE obtains a maximum HS-DPCCH power offset, a minimum HS-DPCCH power offset, and the HS-DPCCH adjustment step size that are corresponding to each cell group in all the cell groups of the UE in the multi-flow transmission mode.

502. With respect to each cell group in all cell groups corresponding to the UE, the UE obtains a CPICH RSCP measurement value of the cell group.

503. If the UE determines that among N times the CPICH RSCP measurement value is obtained, there are M times the obtained CPICH RSCP measurement value is greater than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1, where M is greater than N/2, M is less than or equal to N, and N and M are positive integers.

504. The UE determines whether a current HS-DPCCH power offset of the cell group is a minimum power offset in all cell groups, and, if not, reduces the current HS-DPCCH power offset of the cell group by one HS-DPCCH adjustment step size, where the HS-DPCCH power offset obtained after being reduced by one HS-DPCCH adjustment step size is the second HS-DPCCH power offset, where a time length required for the UE to obtain the CPICH RSCP measurement value for N times is equal to a time length of N power control command combining cycles; or 503'. If the UE determines that among N times the CPICH RSCP measurement value is obtained, there are M times the obtained CPICH RSCP measurement value is smaller than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1, 504'. The UE determines whether a current HS-DPCCH power offset of the cell group is the maximum power offset of the cell group, and, if not, increases the current HS-DPCCH power offset of the cell group by one HS-DPCCH adjustment step size, where the HS-DPCCH power offset obtained after being increased by one HS-DPCCH adjustment step size is the second HS-DPCCH power offset.

505. The UE adjusts current transmit power of the HS-DPCCH according to the second HS-DPCCH power offset of the cell group.

In an application scenario, if the UE is in a HetNet, before step 503 and step 503', the method may further include:

determining, by the UE, that the cell group belongs to a Macro NodeB.

As seen from the above embodiment, the method for power control of an HS-DPCCH in this embodiment adjusts the current transmit power of the HS-DPCCH according to the obtained second HS-DPCCH power offset, which solves the HS-DPCCH receiving performance problem caused by an uplink path loss difference between cells in the prior art.

FIG. 5B is a schematic flowchart of a method for power control of an HS-DPCCH according to an embodiment of the present invention. As shown in FIG. 5B, the method for power control of the HS-DPCCH in this embodiment is described below.

511. If the UE is in a soft handover state and configured to a multi-flow transmission mode, the UE obtains a maximum HS-DPCCH power offset, a minimum HS-DPCCH power offset, and the HS-DPCCH adjustment step size that are corresponding to each cell group in all the cell groups of the UE in the multi-flow transmission mode.

512. With respect to each cell group in all cell groups corresponding to the UE, the UE obtains a CPICH Ec/N0 measurement value of the cell group.

513. The UE determines that among N times the CPICH Ec/N0 measurement value is obtained, there are M times the obtained CPICH Ec/N0 measurement value is greater than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2.

514. The UE determines whether a current HS-DPCCH power offset of the cell group is a minimum power offset in all cell groups, and, if not, reduces the current HS-DPCCH power offset of the cell group by one HS-DPCCH adjustment step size, where the HS-DPCCH power offset obtained after being reduced by one HS-DPCCH adjustment step size is the second HS-DPCCH power offset, where M is greater than N/2, M is less than or equal to N, N and M are positive integers, and a time length required for the UE to obtain the CPICH Ec/N0 measurement value for N times is equal to a time length of N power control command combining cycles;

or

513'. If the UE determines that among N times the CPICH Ec/N0 measurement value is obtained, there are M times the obtained CPICH Ec/N0 measurement value is smaller than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2.

514'. The UE determines whether a current HS-DPCCH power offset of the cell group is the maximum power offset of the cell group, and, if not, increases the current HS-DPCCH power offset of the cell group by one HS-DPCCH adjustment step size, where the HS-DPCCH power offset obtained after being increased by one HS-DPCCH adjustment step size is the second HS-DPCCH power offset.

515. The UE adjusts current transmit power of the HS-DPCCH according to the second HS-DPCCH power offset of the cell group.

In an application scenario, if the UE is in a HetNet, before step 513 and step 513', the method may further include:

determining, by the UE, that the cell group belongs to a Macro NodeB.

As seen from the above embodiment, the method for power control of an HS-DPCCH in this embodiment adjusts the current transmit power of the HS-DPCCH according to the obtained second HS-DPCCH power offset, which solves the HS-DPCCH receiving performance problem caused by an uplink path loss difference between cells in the prior art.

Figure 6A:
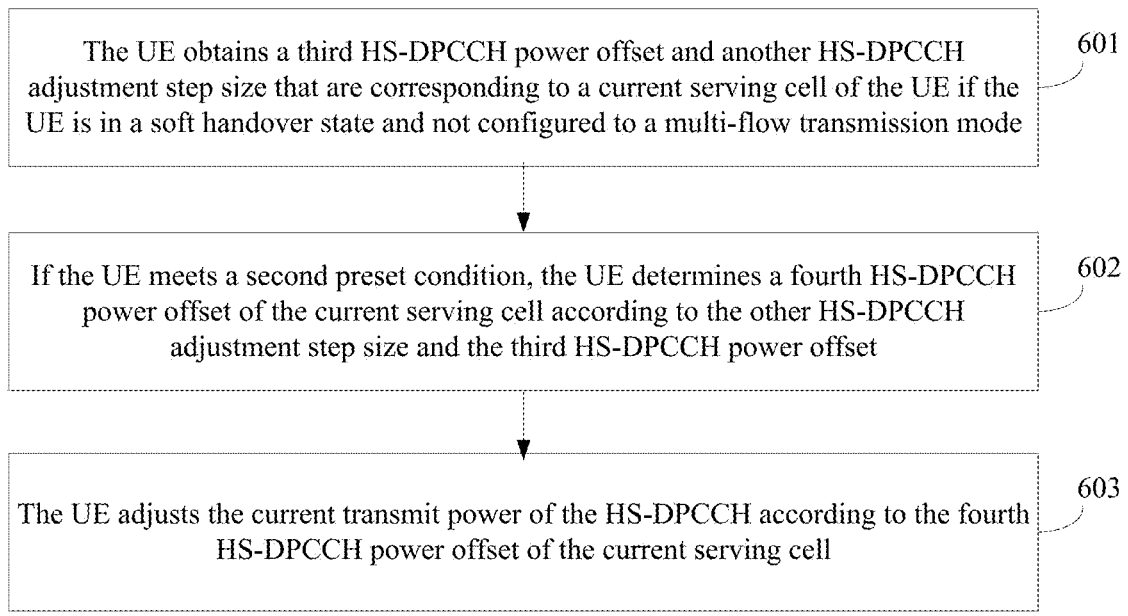
FIG. 6A to FIG. 6G are a schematic flowchart of a method for power control of an HS-DPCCH according to another embodiment of the present invention.

In another optional application scenario, as shown in FIG. 6A, the method for power control of an HS-DPCCH in this embodiment includes the following:

601. The UE obtains a third HS-DPCCH power offset and another HS-DPCCH adjustment step size that are corresponding to a current serving cell of the UE if the UE is in a soft handover state and not configured to a multi-flow transmission mode.

In this embodiment, the UE feeds back the HS-DPCCH to only one serving cell.

602. If the UE meets a second preset condition, the UE determines a fourth HS-DPCCH power offset of the current serving cell according to the another HS-DPCCH adjustment step size and the third HS-DPCCH power offset.

603. The UE adjusts the current transmit power of the HS-DPCCH according to the fourth HS-DPCCH power offset of the current serving cell.

Optionally, the step of "the UE obtaining a third HS-DPCCH power offset and another HS-DPCCH adjustment step size that are corresponding to a current serving cell of the UE" in step 601 specifically includes:

obtaining, by the UE, the maximum HS-DPCCH power offset, the minimum HS-DPCCH power offset, and the another HS-DPCCH adjustment step size that are corresponding to the current serving cell of the UE.

In this embodiment, the obtaining, by the UE, another HS-DPCCH adjustment step size corresponding to a current serving cell of the UE, may include:

determining, by the UE, the another HS-DPCCH adjustment step size according to an adjustment rate currently required by the UE;

or, receiving, by the UE, the another HS-DPCCH adjustment step size sent by a network device, where the another HS-DPCCH adjustment step size is 1/P times a difference between the maximum HS-DPCCH power offset corresponding to the serving cell and the minimum HS-DPCCH power offset corresponding to the serving cell, where P is a natural number greater than or equal to 1.

As seen from the above embodiment, the method for power control of an HS-DPCCH in this embodiment adjusts the current transmit power of the HS-DPCCH according to the obtained second HS-DPCCH power offset, which solves the HS-DPCCH receiving performance problem caused by an uplink path loss difference between cells in the prior art.

Figure 6B:
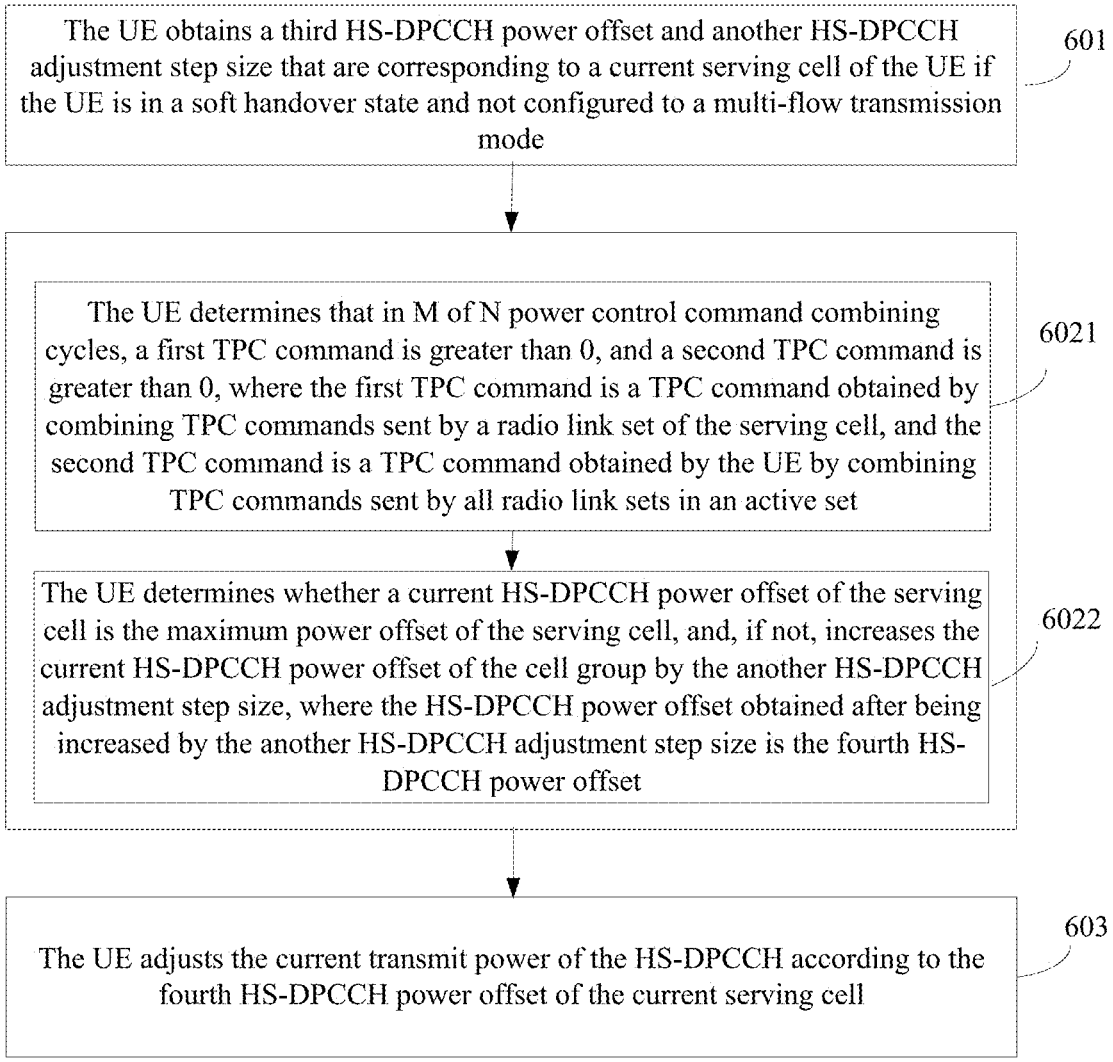

In addition, in a first specific embodiment, as shown in FIG. 6B, "if the UE meets a second preset condition, the UE determines a fourth HS-DPCCH power offset of the serving cell according to the another HS-DPCCH adjustment step size and the third HS-DPCCH power offset" in step 602 specifically includes step 6021 and step 6022 in FIG. 6B:

6021. The UE determines that in M of N power control command combining cycles, a first TPC command is greater than 0, and a second TPC command is greater than 0, where the first TPC command is a TPC command obtained by combining TPC commands sent by a radio link set of the serving cell, and the second TPC command is a TPC command obtained by the UE by combining TPC commands sent by all radio link sets in an active set; and

6022. The UE determines whether a current HS-DPCCH power offset of the serving cell is the maximum power offset of the serving cell, and, if not, increases the current HS-DPCCH power offset of the cell group by the another HS-DPCCH adjustment step size, where the HS-DPCCH power offset obtained after being increased by the another HS-DPCCH adjustment step size is the fourth HS-DPCCH power offset, where M is greater than N/2, M is less than or equal to N, and N and M are positive integers.

Figure 6C:
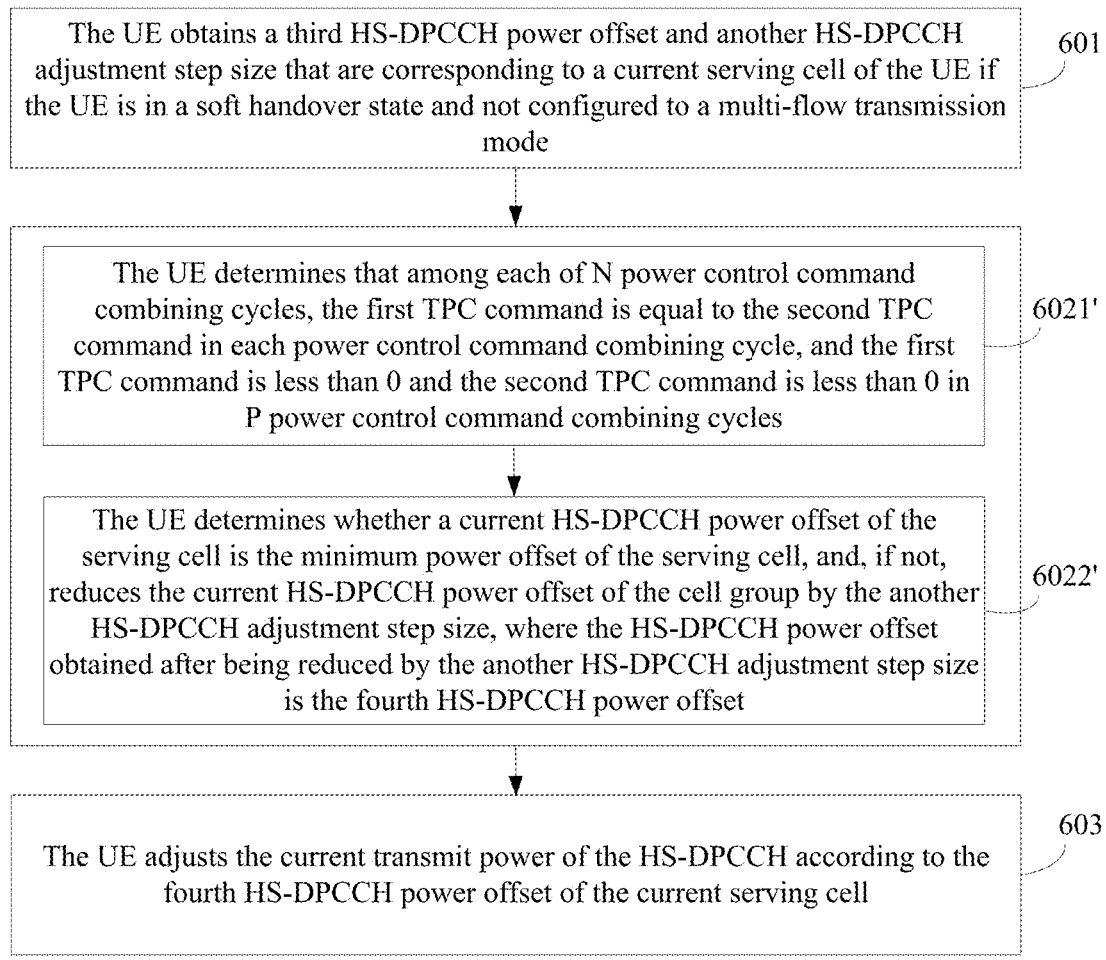

In addition, in a second specific embodiment, as shown in FIG. 6C, "if the UE meets a second preset condition, the UE determines a fourth HS-DPCCH power offset of the serving cell according to the another HS-DPCCH adjustment step size and the third HS-DPCCH power offset" in step 602 specifically includes step 6021' and step 6022' in FIG. 6C:

6021'. The UE determines that in each of N power control command combining cycles, the first TPC command is equal to the second TPC command in each power control command combining cycle, and the first TPC command is less than 0 and the second TPC command is less than 0 in P power control command combining cycles, where the first TPC command is a TPC command obtained by combining TPC commands sent by a radio link set of the serving cell, and the second TPC command is a TPC command obtained by the UE by combining TPC commands sent by all radio link sets in an active set; and

6022'. The UE determines whether a current HS-DPCCH power offset of the serving cell is the minimum power offset of the serving cell, and, if not, reduces the current HS-DPCCH power offset of the cell group by the another HS-DPCCH adjustment step size, where the HS-DPCCH power offset obtained after being reduced by the another HS-DPCCH adjustment step size is the fourth HS-DPCCH power offset.

Figure 6D:
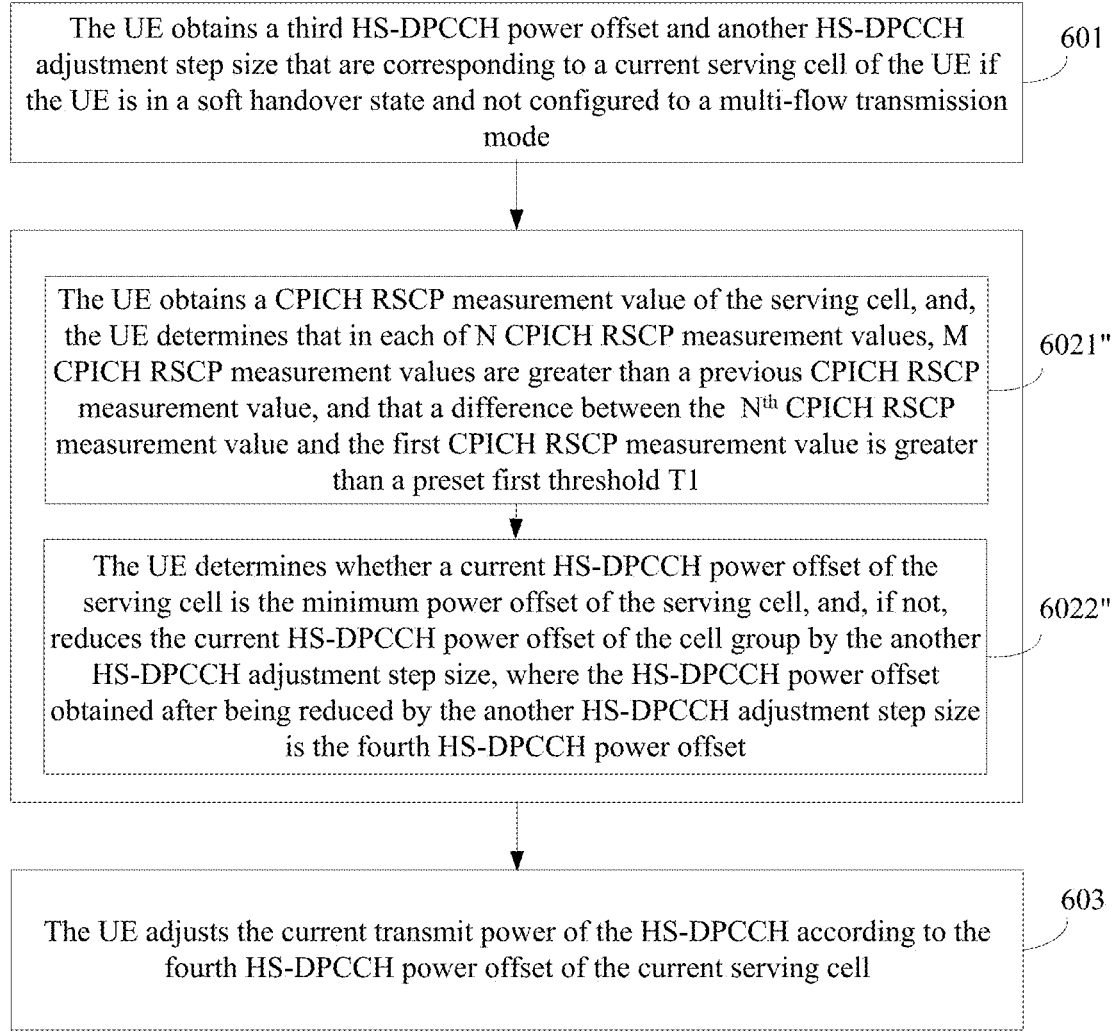

In addition, in a third specific embodiment, as shown in FIG. 6D, "if the UE meets a second preset condition, the UE determines a fourth HS-DPCCH power offset of the serving cell according to the another HS-DPCCH adjustment step size and the third HS-DPCCH power offset" in step 602 specifically includes step 6021" and step 6022" in FIG. 6D.

6021". The UE obtains a CPICH RSCP measurement value of the serving cell, and, the UE determines that among N times the CPICH RSCP measurement value is obtained, there are M times the obtained CPICH RSCP measurement value is greater than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1.

6022". The UE determines whether a current HS-DPCCH power offset of the serving cell is the minimum power offset of the serving cell, and, if not, reduces the current HS-DPCCH power offset of the cell group by the another HS-DPCCH adjustment step size, where the HS-DPCCH power offset obtained after being reduced by the another HS-DPCCH adjustment step size is the fourth HS-DPCCH power offset, where M is greater than N/2, M is less than or equal to N, N and M are positive integers, and a time length required for the UE to obtain the CPICH RSCP measurement value for N times is equal to a time length of N power control command combining cycles.

Figure 6E:
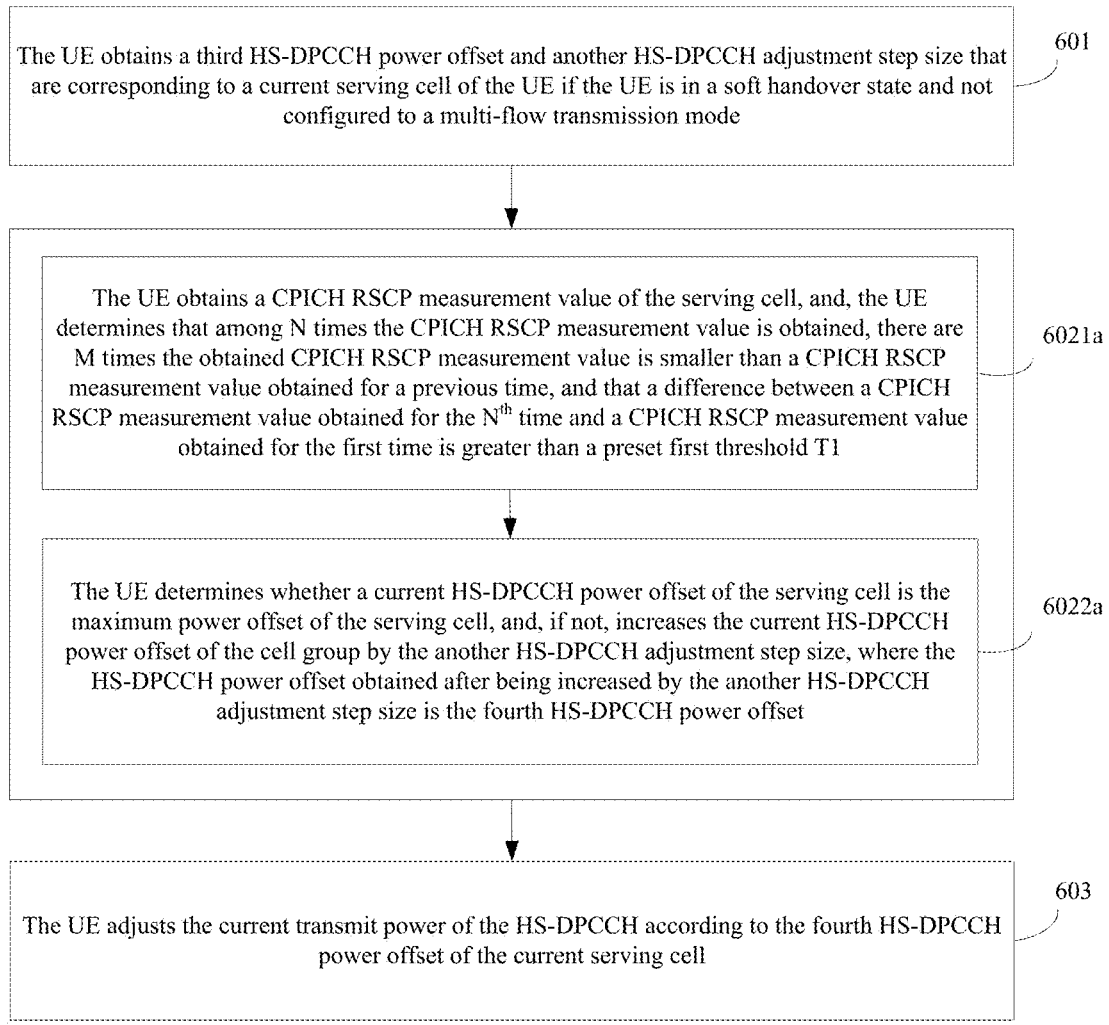

In addition, in a fourth specific embodiment, as shown in FIG. 6E, "if the UE meets a second preset condition, the UE determines a fourth HS-DPCCH power offset of the serving cell according to the another HS-DPCCH adjustment step size and the third HS-DPCCH power offset" in step 602 specifically includes step 6021a and step 6022a in FIG. 6E.

6021a. The UE obtains a CPICH RSCP measurement value of the serving cell, and the UE determines that among N times the CPICH RSCP measurement value is obtained, there are M times the obtained CPICH RSCP measurement value is smaller than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1.

6022a. The UE determines whether a current HS-DPCCH power offset of the serving cell is the maximum power offset of the serving cell, and, if not, increases the current HS-DPCCH power offset of the cell group by the another HS-DPCCH adjustment step size, where the HS-DPCCH power offset obtained after being increased by the another HS-DPCCH adjustment step size is the fourth HS-DPCCH power offset, where M is greater than N/2, M is less than or equal to N, N and M are positive integers, and a time length required for the UE to obtain the CPICH RSCP measurement value for N times is equal to a time length of N power control command combining cycles.

Figure 6F:
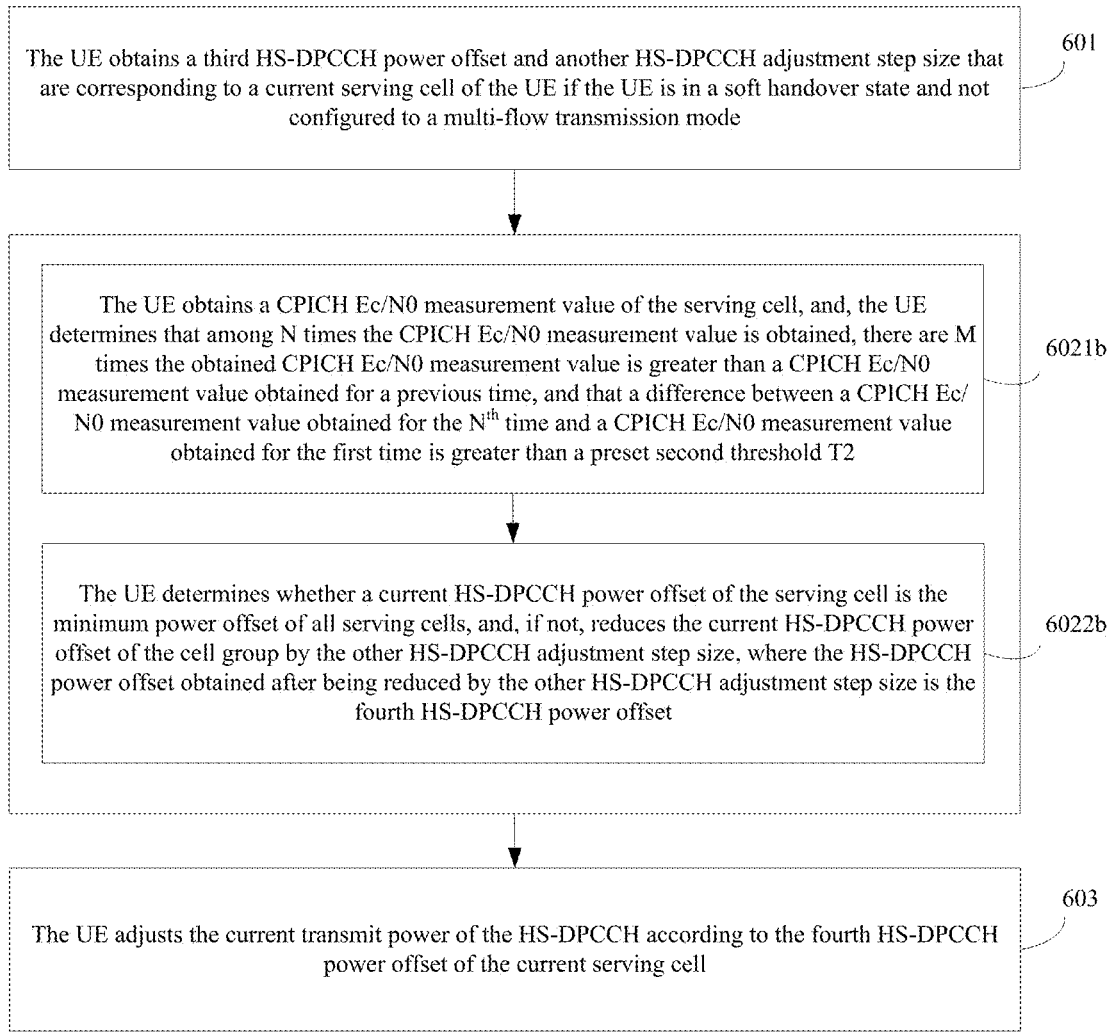

In addition, in a fifth specific embodiment, as shown in FIG. 6F, "if the UE meets a second preset condition, the UE determines a fourth HS-DPCCH power offset of the serving cell according to the another HS-DPCCH adjustment step size and the third HS-DPCCH power offset" in step 602 specifically includes step 6021b and step 6022b in FIG. 6F.

6021b. The UE obtains a CPICH Ec/N0 measurement value of the serving cell, and the UE determines that among N times the CPICH Ec/N0 measurement value is obtained, there are M times the obtained CPICH Ec/N0 measurement value is greater than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2.

6022b. The UE determines whether a current HS-DPCCH power offset of the serving cell is the minimum power offset of all serving cells, and, if not, reduces the current HS-DPCCH power offset of the cell group by the another HS-DPCCH adjustment step size, where the HS-DPCCH power offset obtained after being reduced by the another HS-DPCCH adjustment step size is the fourth HS-DPCCH power offset, where M is greater than N/2, M is less than or equal to N, and N and M are positive integers, and a time length required for the UE to obtain the CPICH Ec/N0 measurement value for N times is equal to a time length of N power control command combining cycles.

Figure 6G:
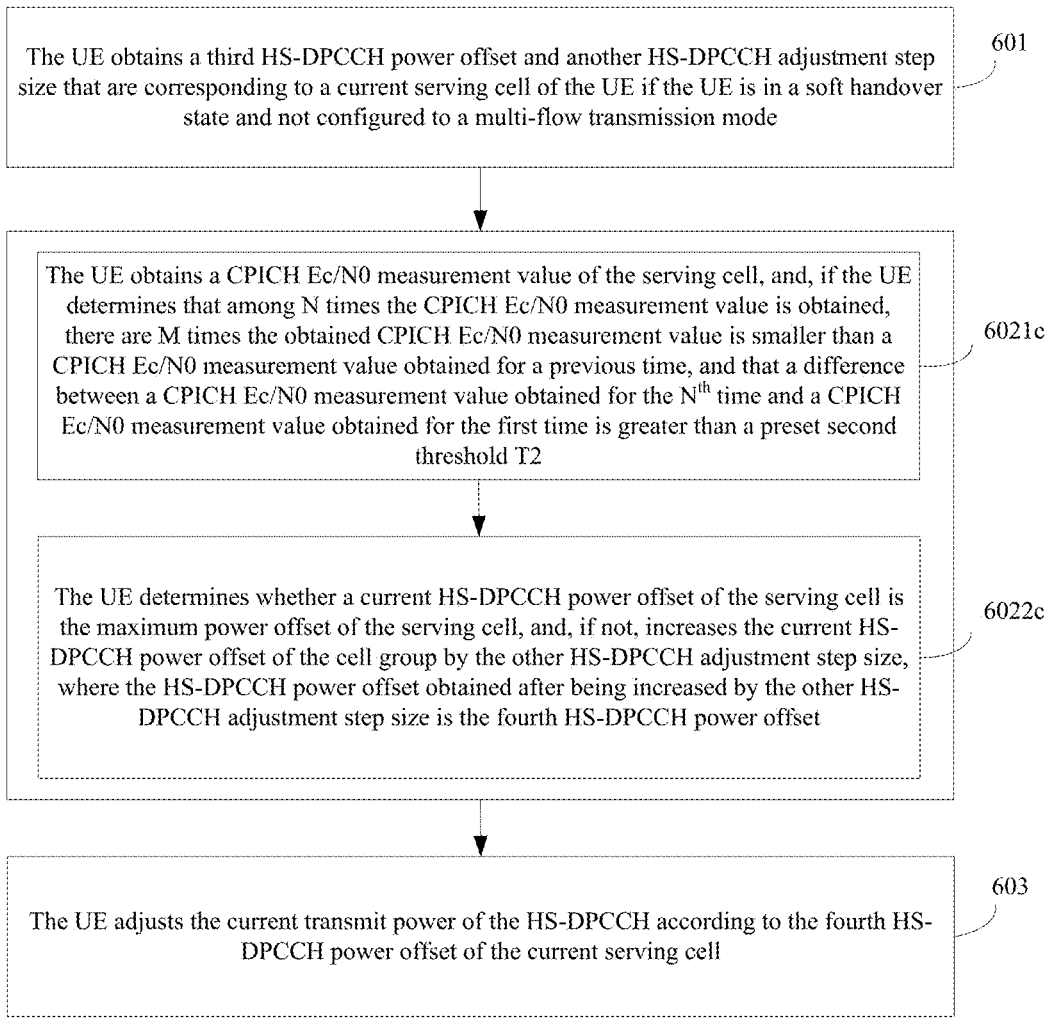

In addition, in a sixth specific embodiment, as shown in FIG. 6G, "if the UE meets a second preset condition, the UE determines a fourth HS-DPCCH power offset of the serving cell according to the another HS-DPCCH adjustment step size and the third HS-DPCCH power offset" in step 602 specifically includes step 6021c and step 6022c in FIG. 6G

6021c. The UE obtains a CPICH Ec/N0 measurement value of the serving cell, and the UE determines that among N times the CPICH Ec/N0 measurement value is obtained, there are M times the obtained CPICH Ec/N0 measurement value is smaller than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2.

6022c. The UE determines whether a current HS-DPCCH power offset of the serving cell is the maximum power offset of the serving cell, and, if not, increases the current HS-DPCCH power offset of the cell group by the another HS-DPCCH adjustment step size, where the HS-DPCCH power offset obtained after being increased by the another HS-DPCCH adjustment step size is the fourth HS-DPCCH power offset, where M is greater than N/2, M is less than or equal to N, N and M are positive integers, and a time length required for the UE to obtain the CPICH Ec/N0 measurement value for N times is equal to a time length of N power control command combining cycles.

The method for power control of the HS-DPCCH in this embodiment solves the HS-DPCCH receiving performance problem caused by an uplink path loss difference between cells in the prior art.

In other embodiments, if the UE is not in a soft handover state, that is, the active set of the UE includes only one cell, the method includes:

Step 1: The UE uses a current second HS-DPCCH power offset fixedly as the minimum HS-DPCCH power offset corresponding to the serving cell of the UE; and Step 2: The UE adjusts current transmit power of the HS-DPCCH according to the second HS-DPCCH power offset.

In other embodiments, if the active set of the UE includes only one cell, that is, the UE sets up a Radio Link (RL) active set with only one cell, the UE is under non-soft handover; if the active set of the UE includes multiple cells, that is, the UE sets up an RL with multiple cells, the UE is under soft handover. The network device cannot configure the UE to an MF-Tx mode until the UE is under soft handover. The UE may receive an HS-DSCH from the cell that has set up an RL with the UE.

If the UE is not configured to the MF-Tx mode, a unique HS-DPCCH power offset (including $\Delta_{ACK}$, $\Delta_{NACK}$, and $\Delta_{CQI}$) is configured, that is, the HS-DPCCH power offset configured for the HS-DSCH serving cell.

If the UE is configured to the MF-Tx mode, on the HS-DPCCH channel, different HS-DPCCH power offsets $\Delta_{ACK}$, $\Delta_{NACK}$, and $\Delta_{CQI}$ are configured for different cells or cell groups to satisfy the HS-DPCCH receiving performance on different cell groups.

In the MF-Tx mode, multiple cells of the same sector of the same NodeB are a cell group. Two cells in a cell group may be differentiated by different carrier frequencies. Multiple cells in a cell group have basically the same coverage. Therefore, the same HS-DPCCH power offset $\Delta_{ACK}$, $\Delta_{NACK}$, or $\Delta_{CQI}$ may be configured in a cell group.

According to parameters delivered by the network device, the UE adjusts the HS-DPCCH power offset by itself. The UE first receives multiple HS-DPCCH power offset parameters (including the power offset parameters corresponding to ACK, NACK, and CQI) delivered by the network device, where the multiple parameters include:

the maximum HS-DPCCH power offset of each cell group and the offset adjustment step size of the cell group; and the minimum HS-DPCCH power offset, where the minimum HS-DPCCH power offset is the same for each cell group.

In addition, the UE adjusts the HS-DPCCH power offset by itself according to the maximum HS-DPCCH power offset and the minimum HS-DPCCH power offset in each cell group, the offset adjustment step size of the cell group, and the TPC command delivered by each cell in the active set. The detailed solution is as follows:

When the UE is in a non-soft handover state, an HS-DSCH serving cell of the UE is A, and, at this time, the HS-DPCCH power offset is fixedly set to be the minimum HS-DPCCH power offset delivered by the network device (in other embodiments, one or more secondary serving cells may be configured for the UE in an MC-HSDPA mode in addition to the HS-DSCH serving cell, but only one HS-DPCCH offset needs to be configured).

After the UE reports an 1a event of the neighboring cell B (the neighboring cell B of the serving cell A), the network device adds the cell B into an active set of the UE, and therefore, the UE gets into the soft handover state.

In the soft handover state, if the network device does not configure the UE to the MF-Tx mode, and the UE still receives the HS-DSCH from only the cell A (or, in MC-HSDPA, the UE receives the HS-DSCH from multiple cells, where the multiple cells belong to one cell group), the UE needs to feed back the HS-DPCCH to the cell A only, and, when the cell B is added into the active set of the UE, the initial value of the HS-DPCCH power offset remains unchanged (that is, the HS-DPCCH power offset is set to be the power offset existent before the neighboring cell B is added into the active set, namely, the minimum HS-DPCCH power offset delivered by the network device).

In the soft handover state, if the network device configures the UE to the MF-Tx mode, that is, the UE receives the HS-DSCH from both the cell A and the cell B (and the cell groups corresponding to them), the UE feeds back the HS-DPCCH to multiple cells under the MF-Tx mode. At this time, the initial value of the HS-DPCCH power offset of the cell B under the MF-Tx mode and the corresponding cell group is set to be the maximum HS-DPCCH power offset of the cell group that is delivered by the network device, and the initial value of the current HS-DPCCH power offset of the cell A and the corresponding cell group remains unchanged (that is, the HS-DPCCH power offset is the power offset existent before the neighboring cell B is added into the active set, namely, the minimum HS-DPCCH power offset delivered by the network device).

The following takes the cell A as an example to describe an HS-DPCCH power offset adjustment solution performed by a UE according to a TPC command delivered by a cell in an active set. As regards the processing of each cell group under the MF-Tx mode, the adjustment solution is the same.

A power control command obtained by the UE by combining the TPCs received from a Radio Link Set (RLS) of the cell A is TPC_cmdA, and a power control command obtained by the UE by combining the received TPCs of all cells in an active set is TPC_cmd. If the UE determines that TPC_cmd<0 && TPC_cmdA>0 occurs in M of N continuous power control cycles, where M>N/2 (the value of N needs to be set in such a way that an evaluation time length is greater than a channel fading cycle, where the channel fading cycle may be estimated by the UE, and the evaluation time length may be the time length of N power control command combining cycles for one determination), it is deemed that the UE is moving away from the cell A, and consequently, the uplink transmit power is primarily controlled by the neighboring cell, the HS-DPCCH received power of the cell A is low, and the decoding performance is low. If the UE further finds that the HS-DPCCH power offset of the cell group A does not reach the maximum value, the UE increases the HS-DPCCH power offset of the cell group A by one step size.

If the UE determines that all reliable combined power control commands in N continuous power control cycles satisfy TPC_cmd==TPC_cmdA, and that TPC_cmd<0 && TPC_cmdA<0 in P power control cycles, where P>N/2, it is deemed that the UE is moving toward the cell A, and the uplink transmit power is primarily controlled by the cell A, and therefore, the HS-DPCCH received power of the cell A is high, and the decoding performance is high. If the UE further finds that the HS-DPCCH power offset of the cell A and the corresponding cell group does not decrease to the minimum HS-DPCCH power offset delivered by the network side, the UE may decrease the HS-DPCCH power offset of the cell group A by one step size.

In addition, if it is determined that the current HS-DPCCH power offset is changed, no more determination is made in the subsequent N power control combining cycles, and the determination is made in the $(N+1)^{th}$ power control combining cycle.

In a HetNet scenario, when the UE is in a soft handover region of the Macro NodeB and the Pico NodeB, no matter whether the UE is configured to the MF-Tx mode or not, the power of transmitting a signal from the UE to the Pico NodeB is always too high, and therefore, it is not necessary to adjust the HS-DPCCH power offset of the cell group of the Pico NodeB, and it is appropriate that the HS-DPCCH power offset corresponding to the cell group of the Pico NodeB is fixedly set to a value delivered by the network device. The HS-DPCCH power offset of the Macro NodeB is adjusted according to the solution described above.

In other embodiments, instead of adjusting the HS-DPCCH power offset according to the TPC command delivered by each cell in the active set, the HS-DPCCH power offset corresponding to the cell and its cell group may be adjusted according to the change of a CPICH RSCP measurement value (or a CPICH Ec/N0 measurement value, that is, the CPICH received signal power divided by the total received power) of each cell in the active set, that is, the HS-DPCCH power offset of a cell decreases gradually with the increase of the measurement value of the cell.

In other embodiments, taking the cell A as an example, once the UE gets into the soft handover state, the UE starts to record the CPICH RSCP measurement value (the measurement value needs filtering) of each cell in the active set and the change value of the measurement value.

If it is found that the CPICH RSCP measurement value of the cell A is on an ascending trend, and, among N1 continuous measurement cycles, the measurement value keeps increasing in M1 measurement cycles, where M1>N1/2, and the accumulated change value exceeds a preset threshold T1, it is deemed that the UE is moving toward the cell A; and, if it is found that the CPICH RSCP measurement value of the cell A is on a descending trend, and, among N1 continuous measurement cycles, the measurement value keeps decreasing in M1 measurement cycles, and the accumulated change value is smaller than a preset threshold T2, it is deemed that the UE is moving away from the cell A. (The value of N1 needs to be set in such a way that the evaluation time length is greater than the channel fading cycle, where the channel fading cycle may be estimated by the UE.)

In addition, if it is determined that the current HS-DPCCH power offset is changed, no more determination is made in the subsequent N1 measurement cycles, and the determination is made in the $(N1+1)^{th}$ measurement cycle.

Figure 7:
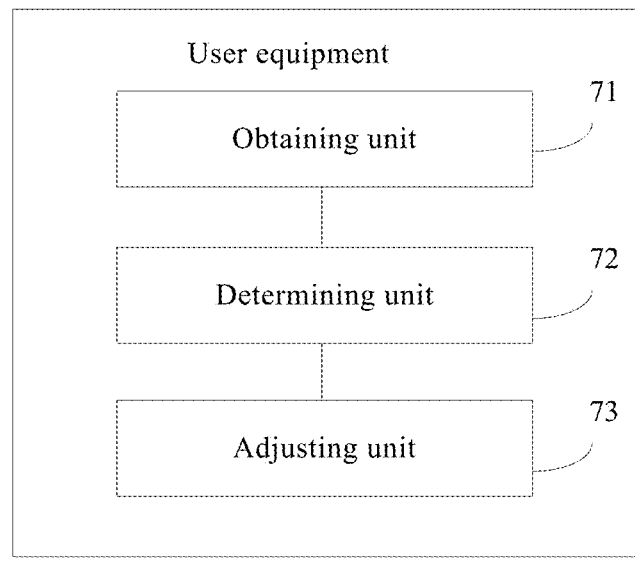
FIG. 7 is a schematic structural diagram of a UE according to an embodiment of the present invention.

According to another aspect of the present invention, a UE is provided in an embodiment of the present invention. As shown in FIG. 7, the UE in this embodiment includes an obtaining unit 71, a determining unit 72, and an adjusting unit 73.

The obtaining unit 71 is configured to: if the UE is in a soft handover state and configured to a multi-flow transmission mode, obtain a first HS-DPCCH power offset and an HS-DPCCH adjustment step size that are corresponding to each cell group in all cell groups of the UE in the multi-flow transmission mode.

The determining unit 72 is configured to: if the UE meets a first preset condition, determine a second HS-DPCCH power offset of the cell group in all cell groups of the UE according to the HS-DPCCH adjustment step size and the first HS-DPCCH power offset.

The adjusting unit 73 is configured to adjust current transmit power of an HS-DPCCH according to the second HS-DPCCH power offset of the cell group.

For example, the obtaining unit 71 is specifically configured to:

if the UE is in a soft handover state and configured to a multi-flow transmission mode, obtain a maximum HS-DPCCH power offset, a minimum HS-DPCCH power offset, and the HS-DPCCH adjustment step size that are corresponding to each cell group in all the cell groups of the UE in the multi-flow transmission mode.

In another embodiment, the obtaining unit 71 is further configured to obtain a third HS-DPCCH power offset and another HS-DPCCH adjustment step size that are corresponding to a current serving cell of the UE if the UE is in a soft handover state and not configured to a multi-flow transmission mode.

The determining unit 72 is further configured to: if the UE meets a second preset condition, determine a fourth HS-DPCCH power offset of the current serving cell according to the another HS-DPCCH adjustment step size and the third HS-DPCCH power offset.

The adjusting unit 73 is further configured to adjust the current transmit power of the HS-DPCCH according to the fourth HS-DPCCH power offset of the current serving cell.

As seen from the foregoing embodiment, the UE in this embodiment can solve the HS-DPCCH receiving performance problem caused by an uplink path loss difference between cells in the prior art.

Figure 8:
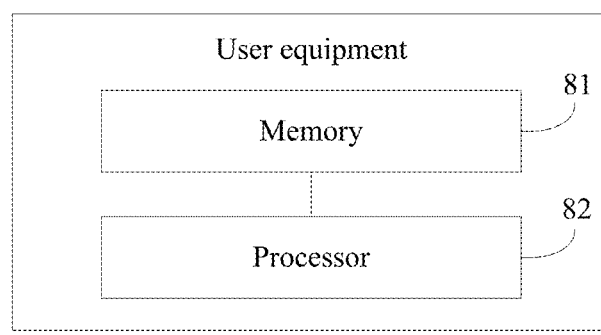
FIG. 8 is a schematic structural diagram of a UE according to another embodiment of the present invention.

According to another aspect of the present invention, a UE is provided in an embodiment of the present invention. As shown in FIG. 8, the UE in this embodiment includes a memory 81 and a processor 82.

The processor 82 is configured to: if the UE is in a soft handover state and configured to a multi-flow transmission mode, obtain an HS-DPCCH power offset and an HS-DPCCH adjustment step size that are corresponding to each cell group in all cell groups of the UE in the multi-flow transmission mode.

The memory 81 is configured to store the HS-DPCCH power offset and the HS-DPCCH adjustment step size that are corresponding to each cell group in all the cell groups and obtained by the processor.

The processor 82 is further configured to: if the UE meets a first preset condition, determine a second HS-DPCCH power offset of the cell group in all cell groups of the UE according to the HS-DPCCH adjustment step size and the first HS-DPCCH power offset; and adjust the current transmit power of an HS-DPCCH according to the second HS-DPCCH power offset of the cell group.

In practical application, the processor 82 may be specifically configured to obtain a maximum HS-DPCCH power offset, a minimum HS-DPCCH power offset, and the HS-DPCCH adjustment step size that are corresponding to each cell group in all the cell groups of the UE in the multi-flow transmission mode.

Correspondingly, the memory 81 stores the maximum HS-DPCCH power offset, the minimum HS-DPCCH power offset, and the HS-DPCCH adjustment step size that are corresponding to each cell group in all the cell groups.

In an application scenario, the processor 82 is further configured to: obtain a third HS-DPCCH power offset and another HS-DPCCH adjustment step size that are corresponding to a current serving cell of the UE if the UE is in a soft handover state and not configured to a multi-flow transmission mode;

determine a fourth HS-DPCCH power offset of the serving cell according to the another HS-DPCCH adjustment step size and the third HS-DPCCH power offset if the UE meets a second preset condition with respect to the current serving cell of the UE; and adjust the current transmit power of the HS-DPCCH according to the fourth HS-DPCCH power offset of the serving cell.

The memory 81 is configured to store the third HS-DPCCH power offset and another HS-DPCCH adjustment step size that are corresponding to a current serving cell of the UE and obtained by the processor 82. Optionally, the memory 81 may further store a second preset condition.

As seen from the foregoing embodiment, the UE in this embodiment can solve the HS-DPCCH receiving performance problem caused by an uplink path loss difference between cells in the prior art.

It should be understood that in the foregoing UE embodiments, the arrangement of the function units is illustrative in nature. In practical application, the foregoing functions may be undertaken by different function units as required, for example, according to corresponding hardware configuration requirements or software implementation convenience, that is, the internal structure of the UE is divided into different function units to implement all or part of the functions described above. Moreover, in practical application, the corresponding function units in the embodiment may be implemented by corresponding hardware, or by corresponding software executed by the corresponding hardware. For example, the adjusting unit may be a general processor or another hardware device capable of executing corresponding computer programs to implement the foregoing functions. (Such principles are applicable to all embodiments provided herein.)

Persons of ordinary skill in the art may understand that, all or a part of the steps of the foregoing method embodiments may be implemented by a program instructing relevant hardware. The foregoing programs may be stored in a computer readable storage medium. When the program runs, the steps of the forgoing method embodiments are performed. The foregoing storage medium includes various mediums capable of storing program codes, such as a ROM, a RAM, a magnetic disk, or an optical disc.

Finally, it should be noted that the foregoing embodiments are merely intended for describing the technical solutions of the present invention, other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the spirit and scope of the technical solutions of the embodiments of the present invention.

What is claimed is:

1. A method for power control of a High Speed Dedicated Physical Control Channel (HS-DPCCH), the method comprising:

obtaining, by a User Equipment (UE), a first HS-DPCCH power offset and an HS-DPCCH adjustment step size that are corresponding to each cell group in all cell groups of the UE in the multi-flow transmission mode when the UE is in a soft handover state and configured to a multi-flow transmission mode;

determining, by the UE, a second HS-DPCCH power offset of the cell group in all cell groups of the UE according to the HS-DPCCH adjustment step size and the first HS-DPCCH power offset when the UE meets a first preset condition; and adjusting, by the UE, current transmit power of the HS-DPCCH according to the second HS-DPCCH power offset of the cell group.

2. The method according to claim 1, wherein obtaining the first HS-DPCCH power offset comprises obtaining, by the UE, a maximum HS-DPCCH power offset and a minimum HS-DPCCH power offset that are corresponding to each cell group in all the cell groups of the UE in the multi-flow transmission mode.

3. The method according to claim 2, wherein the maximum HS-DPCCH power offset and the minimum HS-DPCCH power offset comprises receiving, by the UE, control information sent by a Radio Network Controller (RNC) according to information of a serving cell, wherein the control information comprises the maximum HS-DPCCH power offset and the minimum HS-DPCCH power offset that are corresponding to each cell group.

4. The method according to claim 2, wherein determining the second HS-DPCCH power offset of the cell group according to the HS-DPCCH adjustment step size and the first HS-DPCCH power offset, comprises:

determining, by the UE, that in M of N power control command combining cycles, a first Transmitted Power Command (TPC) command is greater than 0 and a second TPC command is greater than 0, wherein the first TPC command is a TPC command obtained by combining TPC commands sent by a radio link set of the cell group, and the second TPC command is a TPC command obtained by the UE by combining TPC commands sent by all radio link sets in an active set; and determining, by the UE, whether a current HS-DPCCH power offset of the cell group is the maximum power offset of the cell group, and, if the current HS-DPCCH power offset of the cell group is not the maximum power offset of the cell group, increasing the current HS-DPCCH power offset of the cell group by one HS-DPCCH adjustment step size, wherein the HS-DPCCH power offset obtained after being increased by one HS-DPCCH adjustment step size is the second HS-DPCCH power offset, and wherein M is greater than N/2, M is less than or equal to N, and N and M are positive integers.

5. The method according to claim 2, wherein determining the second HS-DPCCH power offset of the cell group according to the HS-DPCCH adjustment step size and the first HS-DPCCH power offset, comprises:

determining, by the UE, that in each of N power control command combining cycles, a first TPC command is equal to a second TPC command in each power control command combining cycle, and that the first TPC command is less than 0 and the second TPC command is less than 0 in P power control command combining cycles, wherein the first TPC command is a TPC command obtained by combining TPC commands sent by a radio link set of the cell group, and the second TPC command is a TPC command obtained by the UE by combining TPC commands sent by all radio link sets in an active set; and determining, by the UE, whether a current HS-DPCCH power offset of the cell group is a minimum power offset in all cell groups, and, if the current HS-DPCCH power offset of the cell group is not the minimum power offset in all cell groups, reducing the current HS-DPCCH power offset of the cell group by one HS-DPCCH adjustment step size, wherein the HS-DPCCH power offset obtained after being reduced by one HS-DPCCH adjustment step size is the second HS-DPCCH power offset, wherein P is greater than N/2, P is less than or equal to N, and N and P are positive integers.

6. The method according to claim 2, wherein determining the second HS-DPCCH power offset of the cell group according to the HS-DPCCH adjustment step size and the first HS-DPCCH power offset, comprises:

obtaining, by the UE, a downlink Common Pilot Channel Received Signal Code Power (CPICH RSCP) measurement value of the cell group; and determining, by the UE, that among N times the CPICH RSCP measurement value is obtained, there are M times the obtained CPICH RSCP measurement value is greater than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1; and determining, by the UE, whether a current HS-DPCCH power offset of the cell group is a minimum power offset in all cell groups, and, if the current HS-DPCCH power offset of the cell group is not the minimum power offset in all cell groups, reducing the current HS-DPCCH power offset of the cell group by one HS-DPCCH adjustment step size, wherein the HS-DPCCH power offset obtained after being reduced by one HS-DPCCH adjustment step size is the second HS-DPCCH power offset, wherein M is greater than N/2, M is less than or equal to N, N and M are positive integers, and a time length required for the UE to obtain the CPICH RSCP measurement value for N times is equal to a time length of N power control command combining cycles.

7. The method according to claim 2, wherein determining the second HS-DPCCH power offset of the cell group according to the HS-DPCCH adjustment step size and the first HS-DPCCH power offset, comprises:

obtaining, by the UE, a CPICH RSCP measurement value of the cell group; and determining, by the UE, that, among N times the CPICH RSCP measurement value is obtained, there are M times the obtained CPICH RSCP measurement value is smaller than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1;

determining, by the UE, whether a current HS-DPCCH power offset of the cell group is the maximum power offset of the cell group, and, if the current HS-DPCCH power offset of the cell group is not the maximum power offset of the cell group, increasing the current HS-DPCCH power offset of the cell group by one HS-DPCCH adjustment step size, wherein the HS-DPCCH power offset obtained after being increased by one HS-DPCCH adjustment step size is the second HS-DPCCH power offset, wherein M is greater than N/2, M is less than or equal to N, and N and M are positive integers.

8. The method according to claim 2, wherein determining the second HS-DPCCH power offset of the cell group according to the HS-DPCCH adjustment step size and the first HS-DPCCH power offset, comprises:

obtaining, by the UE, a CPICH Ec/N0 measurement value of the cell group;

determining, by the UE, that, among N times the CPICH Ec/N0 measurement value is obtained, there are M times the obtained CPICH Ec/N0 measurement value is greater than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2;

determining, by the UE, whether a current HS-DPCCH power offset of the cell group is a minimum power offset in all cell groups, and, if the current HS-DPCCH power offset of the cell group is not a minimum power offset in all cell groups, reducing the current HS-DPCCH power offset of the cell group by one HS-DPCCH adjustment step size, wherein the HS-DPCCH power offset obtained after being reduced by one HS-DPCCH adjustment step size is the second HS-DPCCH power offset, wherein M is greater than N/2, M is less than or equal to N, N and M are positive integers, and a time length required for the UE to obtain the CPICH Ec/N0 measurement value for N times is equal to a time length of N power control command combining cycles.

9. The method according to claim 2, wherein determining the second HS-DPCCH power offset of the cell group according to the HS-DPCCH adjustment step size and the first HS-DPCCH power offset, comprises:

obtaining, by the UE, a CPICH Ec/N0 measurement value of the cell group; and determining, by the UE, that among N times the CPICH Ec/N0 measurement value is obtained, there are M times the obtained CPICH Ec/N0 measurement value is smaller than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2;

determining, by the UE, whether a current HS-DPCCH power offset of the cell group is the maximum power offset of the cell group, and, if the current HS-DPCCH power offset of the cell group is not the maximum power offset of the cell group, increasing the current HS-DPCCH power offset of the cell group by one HS-DPCCH adjustment step size, wherein the HS-DPCCH power offset obtained after being increased by one HS-DPCCH adjustment step size is the second HS-DPCCH power offset, wherein M is greater than N/2, M is less than or equal to N, and N and M are positive integers.

10. The method according to claim 1, wherein obtaining the HS-DPCCH adjustment step size corresponding to each cell group in all cell groups of the UE in the multi-flow transmission mode, comprises:
determining, by the UE, the HS-DPCCH adjustment step size according to an adjustment rate currently required by the UE; or
receiving, by the UE, the HS-DPCCH adjustment step size sent by a network device;
wherein the HS-DPCCH adjustment step size is 1/W times a difference between the maximum HS-DPCCH power offset of the cell group and the minimum HS-DPCCH power offset of the cell group, wherein W is a natural number greater than or equal to 1.

11. The method according to any one of claim 1, wherein the UE is in the soft handover state and is not configured to the multi-flow transmission mode and wherein the method further comprises:
obtaining, by the UE, a third HS-DPCCH power offset and another HS-DPCCH adjustment step size that are corresponding to a current serving cell of the UE;
determining, by the UE, a fourth HS-DPCCH power offset of the current serving cell according to the another HS-DPCCH adjustment step size and the third HS-DPCCH power offset when the UE meets a second preset condition; and
adjusting, by the UE, the current transmit power of the HS-DPCCH according to the fourth HS-DPCCH power offset of the current serving cell.

12. The method according to claim 11, wherein obtaining the third HS-DPCCH power offset comprises obtaining, by the UE, a maximum HS-DPCCH power offset and a minimum HS-DPCCH power offset that are corresponding to the current serving cell of the UE.

13. The method according to claim 12, wherein determining the fourth HS-DPCCH power offset of the serving cell according to the another HS-DPCCH adjustment step size and the third HS-DPCCH power offset, comprises:
determining, by the UE, that in M of N power control command combining cycles, a first TPC command is greater than 0, and a second TPC command is greater than 0, wherein the first TPC command is a TPC command obtained by combining TPC commands sent by a radio link set of the serving cell, and the second TPC command is a TPC command obtained by the UE by combining TPC commands sent by all radio link sets in an active set; and
determining, by the UE, whether a current HS-DPCCH power offset of the serving cell is the maximum power offset of the serving cell, and, if the current HS-DPCCH power offset of the serving cell is not the maximum power offset of the serving cell, increasing the current HS-DPCCH power offset of the serving cell by the another HS-DPCCH adjustment step size, wherein the HS-DPCCH power offset obtained after being increased by the another HS-DPCCH adjustment step size is the fourth HS-DPCCH power offset; or
determining, by the UE, that in each of N power control command combining cycles, the first TPC command is equal to the second TPC command in each power control command combining cycle, and the first TPC command is less than 0 and the second TPC command is less than 0 in P power control command combining cycles,
wherein the first TPC command is a TPC command obtained by combining TPC commands sent by a radio link set of the serving cell, and the second TPC command is a TPC command obtained by the UE by combining TPC commands sent by all radio link sets in an active set; and
determining, by the UE, whether a current HS-DPCCH power offset of the serving cell is the minimum power offset of the serving cell, and, if the current HS-DPCCH power offset of the serving cell is not the minimum power offset of the serving cell, reducing the current HS-DPCCH power offset of the serving cell by the another HS-DPCCH adjustment step size, wherein the HS-DPCCH power offset obtained after being reduced by the another HS-DPCCH adjustment step size is the fourth HS-DPCCH power offset,
wherein M is greater than N/2, M is less than or equal to N, P is greater than N/2, P is less than or equal to N, and N, M, and P are positive integers.

14. The method according to claim 12, wherein determining the fourth HS-DPCCH power offset of the serving cell according to the another HS-DPCCH adjustment step size and the third HS-DPCCH power offset, comprises:
obtaining, by the UE, a CPICH RSCP measurement value of the serving cell, and, if the UE determines that, among N times the CPICH RSCP measurement value is obtained, there are M times the obtained CPICH RSCP measurement value is greater than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1,
determining, by the UE, whether a current HS-DPCCH power offset of the serving cell is the minimum power offset of the serving cell, and, if the current HS-DPCCH power offset of the serving cell is not the minimum power offset of the serving cell, reducing the current HS-DPCCH power offset of the serving cell by the another HS-DPCCH adjustment step size, wherein the HS-DPCCH power offset obtained after being reduced by the another HS-DPCCH adjustment step size is the fourth HS-DPCCH power offset,
or
obtaining, by the UE, a CPICH RSCP measurement value of the serving cell, and, if the UE determines that among N times the CPICH RSCP measurement value is obtained, there are M times the obtained CPICH RSCP measurement value is smaller than a CPICH RSCP measurement value obtained for a previous time, and that a difference between a CPICH RSCP measurement value obtained for the $N^{th}$ time and a CPICH RSCP measurement value obtained for the first time is greater than a preset first threshold T1,
determining, by the UE, whether a current HS-DPCCH power offset of the serving cell is the maximum power offset of the serving cell, and, if the current HS-DPCCH power offset of the serving cell is not the maximum power offset of the serving cell, increasing the current HS-DPCCH power offset of the serving cell by the another HS-DPCCH adjustment step size, wherein the HS-DPCCH power offset obtained after being increased by the another HS-DPCCH adjustment step size is the fourth HS-DPCCH power offset,
wherein M is greater than N/2, M is less than or equal to N, and N and M are positive integers, and a time length required for the UE to obtain the CPICH RSCP measurement values for N times is equal to a time length of N power control command combining cycles.

15. The method according to claim 12, wherein determining the fourth HS-DPCCH power offset of the serving cell according to the another HS-DPCCH adjustment step size and the third HS-DPCCH power offset, comprises:

obtaining, by the UE, a CPICH Ec/N0 measurement value of the serving cell, and, if the UE determines that, among N times the CPICH Ec/N0 measurement value is obtained, there are M times the obtained CPICH Ec/N0 measurement value is greater than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2, determining, by the UE, whether a current HS-DPCCH power offset of the serving cell is the minimum power offset of all serving cells, and, if the current HS-DPCCH power offset of the serving cell is not the minimum power offset of all serving cells, reducing the current HS-DPCCH power offset of the serving cell by the another HS-DPCCH adjustment step size, wherein the HS-DPCCH power offset obtained after being reduced by the another HS-DPCCH adjustment step size is the fourth HS-DPCCH power offset, or obtaining, by the UE, a CPICH Ec/N0 measurement value of the serving cell, and, if the UE determines that among N times the CPICH Ec/N0 measurement value is obtained, there are M times the obtained CPICH Ec/N0 measurement value is smaller than a CPICH Ec/N0 measurement value obtained for a previous time, and that a difference between a CPICH Ec/N0 measurement value obtained for the $N^{th}$ time and a CPICH Ec/N0 measurement value obtained for the first time is greater than a preset second threshold T2, determining, by the UE, whether a current HS-DPCCH power offset of the serving cell is the maximum power offset of the serving cell, and, if the current HS-DPCCH power offset of the serving cell is not the maximum power offset of the serving cell, increasing the current HS-DPCCH power offset of the serving cell by the another HS-DPCCH adjustment step size, wherein the HS-DPCCH power offset obtained after being increased by the another HS-DPCCH adjustment step size is the fourth HS-DPCCH power offset, wherein M is greater than N/2, N and M are positive integers, and a time length required for the UE to obtain the CPICH Ec/N0 measurement value for N times is equal to a time length of N power control command combining cycles.

16. The method according to claim 11, wherein obtaining another HS-DPCCH adjustment step size corresponding to a current serving cell of the UE, comprises:

determining, by the UE, the another HS-DPCCH adjustment step size according to an adjustment rate currently required by the UE; or receiving, by the UE, the another HS-DPCCH adjustment step size sent by the network device;

wherein the another HS-DPCCH adjustment step size is 1/P times a difference between the maximum HS-DPCCH power offset corresponding to the serving cell and the minimum HS-DPCCH power offset corresponding to the serving cell, wherein P is a natural number greater than or equal to 1.

17. The method according to any one of claim 1, wherein the UE is not in the soft handover state and the method further comprises:

using, by the UE, a current second HS-DPCCH power offset fixedly as the minimum HS-DPCCH power offset corresponding to the serving cell of the UE; and adjusting, by the UE, the current transmit power of the HS-DPCCH according to the second HS-DPCCH power offset.

18. A User Equipment (UE), comprising:

an obtaining unit, configured to obtain a first High Speed Dedicated Physical Control Channel (HS-DPCCH) power offset and an HS-DPCCH adjustment step size that are corresponding to each cell group in all cell groups of the UE in the multi-flow transmission mode when the UE is in a soft handover state and configured to a multi-flow transmission mode;

a determining unit, configured to determine a second HS-DPCCH power offset of the cell group in all cell groups of the UE according to the HS-DPCCH adjustment step size and the first HS-DPCCH power offset when if the UE meets a first preset condition; and an adjusting unit, configured to adjust current transmit power of an HS-DPCCH according to the second HS-DPCCH power offset of the cell group.

19. The UE according to claim 18, wherein the obtaining unit is specifically configured to a minimum HS-DPCCH power offset, and the HS-DPCCH adjustment step size that are corresponding to each cell group in all the cell groups of the UE in the multi-flow transmission mode when the UE is in a soft handover state and configured to a multi-flow transmission mode, obtain a maximum HS-DPCCH power offset.

20. The UE according to claim 18, wherein the obtaining unit is further configured to obtain a third HS-DPCCH power offset and another HS-DPCCH adjustment step size corresponding to a current serving cell of the UE if the UE is in a soft handover state and not configured to a multi-flow transmission mode; and wherein the determining unit is further configured to determine a fourth HS-DPCCH power offset of the current serving cell according to the another HS-DPCCH adjustment step size and the third HS-DPCCH power offset when the UE meets a second preset condition; and wherein the adjusting unit is further configured to adjust the current transmit power of the HS-DPCCH according to the fourth HS-DPCCH power offset of the current serving cell.

* * * * *